United States Patent
Aramayo, II et al.

(10) Patent No.: US 8,151,925 B2
(45) Date of Patent: Apr. 10, 2012

(54) TWO-WHEELED VEHICLE

(75) Inventors: Gus A Aramayo, II, Wyoming, MN (US); Ronald A. Vorndran, Osceola, WI (US); James Arthur John Holroyd, Stillwater, MN (US); Packiarajan Selvam, Plymouth, MN (US); Michael J. Hanten, Delano, MN (US); Dallas B. Wynne, Dresser, WI (US)

(73) Assignee: Polaris Industries Inc., Medina, MN (US)

(*) Notice: Subject to any disclaimer, the term of this patent is extended or adjusted under 35 U.S.C. 154(b) by 205 days.

(21) Appl. No.: 12/478,621

(22) Filed: Jun. 4, 2009

(65) Prior Publication Data

US 2010/0307852 A1 Dec. 9, 2010

(51) Int. Cl.
*B62J 9/00* (2006.01)
(52) U.S. Cl. .......................... 180/219; 224/413
(58) Field of Classification Search .................. 180/219; 224/413
See application file for complete search history.

(56) References Cited

U.S. PATENT DOCUMENTS

| | | | |
|---|---|---|---|
| 2,755,873 A | 7/1956 | Klaue | |
| 3,866,946 A | 2/1975 | Robison | |
| 3,935,445 A | 1/1976 | Preisler | |
| D242,031 S | 10/1976 | Hartlaub | |
| 4,260,170 A | 4/1981 | Terai et al. | |
| 4,580,706 A * | 4/1986 | Jackson et al. | 224/427 |
| 4,615,556 A | 10/1986 | Stahel | |
| 4,624,470 A | 11/1986 | Love | |
| 4,793,293 A | 12/1988 | Minami | |
| 4,887,687 A | 12/1989 | Asai et al. | |
| 5,025,883 A * | 6/1991 | Morinaka et al. | 180/219 |
| 5,107,949 A * | 4/1992 | Gotoh et al. | 180/219 |
| D361,311 S | 8/1995 | Lindby | |
| 5,608,957 A * | 3/1997 | Hanagan | 29/91.1 |
| 5,839,536 A * | 11/1998 | Tanaka | 180/227 |
| 6,007,150 A | 12/1999 | Clerkin et al. | |
| 6,068,075 A * | 5/2000 | Saiki | 180/219 |
| 6,203,093 B1 | 3/2001 | Suzuki et al. | |
| D442,892 S | 5/2001 | Timmermann | |
| 6,223,960 B1 * | 5/2001 | Powell et al. | 224/429 |
| 6,224,081 B1 | 5/2001 | Wayman et al. | |
| 6,234,266 B1 * | 5/2001 | Saiki | 180/219 |
| 6,276,482 B1 | 8/2001 | Moriya et al. | |
| D447,985 S | 9/2001 | Ino et al. | |
| 6,394,214 B1 | 5/2002 | Hahm | |
| 6,419,039 B1 | 7/2002 | Wagner | |
| 6,481,522 B1 | 11/2002 | Adachi | |
| 6,484,855 B1 | 11/2002 | Yaple | |
| D470,097 S * | 2/2003 | Song | D12/410 |
| 6,619,415 B1 | 9/2003 | Hasumi et al. | |
| D484,074 S | 12/2003 | Henneberry | |

(Continued)

OTHER PUBLICATIONS

Polaris Sales Inc., Victory 2004 Accelerating the Art of the American Cruiser brochure, 2003, pp. 1-36, Medina, Minnesota, USA.

(Continued)

*Primary Examiner* — Joanne Silbermann
*Assistant Examiner* — Michael Stabley
(74) *Attorney, Agent, or Firm* — Faegre Baker Daniels LLP

(57) ABSTRACT

A two-wheeled vehicle is disclosed. The two-wheeled vehicle may include a passenger hand grip which is stowable under a straddle seat of the vehicle. The two-wheeled vehicle may include saddlebags having an open bottom.

34 Claims, 34 Drawing Sheets

U.S. PATENT DOCUMENTS

| | | |
|---|---|---|
| 6,655,740 B1 | 12/2003 | Hanagan |
| 6,796,030 B2 | 9/2004 | Mochizuki et al. |
| 6,832,710 B2 * | 12/2004 | Galbraith et al. ............ 224/413 |
| 6,896,279 B2 | 5/2005 | Galvagno |
| 6,951,417 B2 | 10/2005 | Ito et al. |
| 6,969,083 B2 | 11/2005 | Egan |
| D513,719 S | 1/2006 | Egan |
| 6,991,290 B1 | 1/2006 | Wiertzema |
| 7,207,470 B2 * | 4/2007 | Akita et al. .................... 224/413 |
| 7,278,560 B2 * | 10/2007 | Aron ............................ 224/413 |
| 7,311,232 B2 * | 12/2007 | Watanabe et al. ............. 224/413 |
| D567,715 S | 4/2008 | Bew et al. |
| 7,360,963 B1 | 4/2008 | Burns |
| D574,299 S | 8/2008 | Kouchi et al. |
| D576,921 S | 9/2008 | Tong |
| 7,537,281 B2 | 5/2009 | Riondato |
| 7,543,673 B2 | 6/2009 | Lachapelle et al. |
| D597,891 S | 8/2009 | Andoh |
| D624,853 S | 10/2010 | Song et al. |
| 2004/0164113 A1 * | 8/2004 | Thomas et al. ............... 224/413 |
| 2004/0206566 A1 | 10/2004 | Katsura |
| 2005/0150703 A1 | 7/2005 | Nakagome et al. |
| 2005/0150921 A1 * | 7/2005 | Schneider .................... 224/413 |
| 2005/0174787 A1 | 8/2005 | Uemoto et al. |
| 2007/0018420 A1 | 1/2007 | Hoshi |
| 2007/0057484 A1 | 3/2007 | Gilman |
| 2007/0151789 A1 | 7/2007 | Bracy et al. |
| 2008/0093146 A1 | 4/2008 | Kobayashi |
| 2008/0169134 A1 * | 7/2008 | Tomolillo et al. ............. 180/6.24 |
| 2008/0169149 A1 * | 7/2008 | Holroyd et al. ............... 180/227 |
| 2008/0173122 A1 * | 7/2008 | Bagnariol ....................... 74/478 |
| 2008/0203782 A1 | 8/2008 | Bigolin |
| 2008/0246250 A1 | 10/2008 | LaCour |
| 2010/0012695 A1 * | 1/2010 | DeMilio ........................ 224/413 |
| 2010/0025140 A1 | 2/2010 | Takenaka et al. |
| 2010/0025443 A1 * | 2/2010 | Racz et al. .................... 224/545 |

OTHER PUBLICATIONS

Polaris Sales Inc., Victory Motorcycles 2005 the New American Motorcycle brochure, 2004, pp. 1-22, Medina, Minnesota, USA.

Polaris Sales Inc., Victory 2006 brochure, 2005, pp. 1-28, Medina, Minnesota, USA.

Polaris Sales, Inc., Victory the New American Motorcycle 2007 brochure, 2006, pp. 1-15, Medina, Minnesota, USA.

Polaris Sales Inc., Victory the New American Motorcycle 2008 brochure, 2007, pp. 1-14, Medina, Minnesota, USA.

Polaris Sales Inc., Celebrating 10 Years of Victory the New American Motorcycle 2009 brochure, 2008, pp. 1-16, Medina, Minnesota, USA.

Victory Motorcycle 2005 Models, retrieved from http://www.bikernet.com/news/PageViewer.asp?PageID=246>, Oct. 15, 2009, 20 pages.

Harley-Davidson, Genuine Motor Accessories, Adjustable Highway Peg Mounting Kit—360 Degrees webpage, 1 page.

Harley-Davidson, FLHR Road King, 2008, 1 page.

Harley-Davidson,, FLHX Street Glide, 2008, 1 page.

Harley-Davidson, FLH, 1 page.

Harley-Davidson, Genuine Motor Accessories, Adjustable Highway Peg Mounting Kit—Long Offset webpage, 1 page.

Harley-Davidson, Genuine Motor Accessories, Adjustable Highway Peg Mounting Kit—Short Offset webpage, 1 page.

Harley-Davidson, Genuine Motor Accessories, Adjustable Highway Peg Mounting Kit—Short Angled webpage, 1 page.

Harley-Davidson, Genuine Motor Accessories, Adjustable Highway Peg Mounting Kit—Long Angled webpage, 1 page.

* cited by examiner

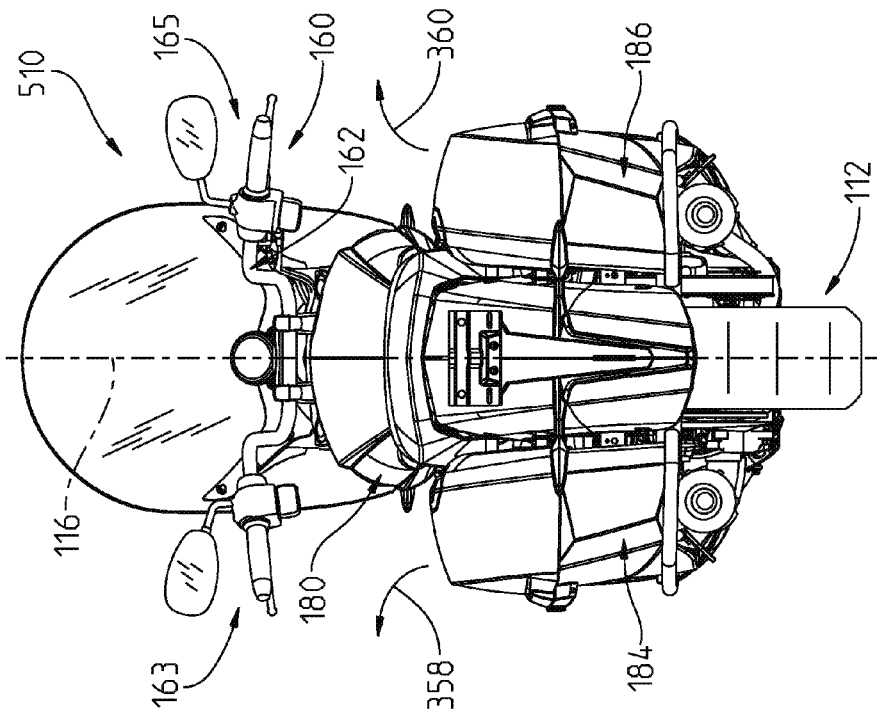
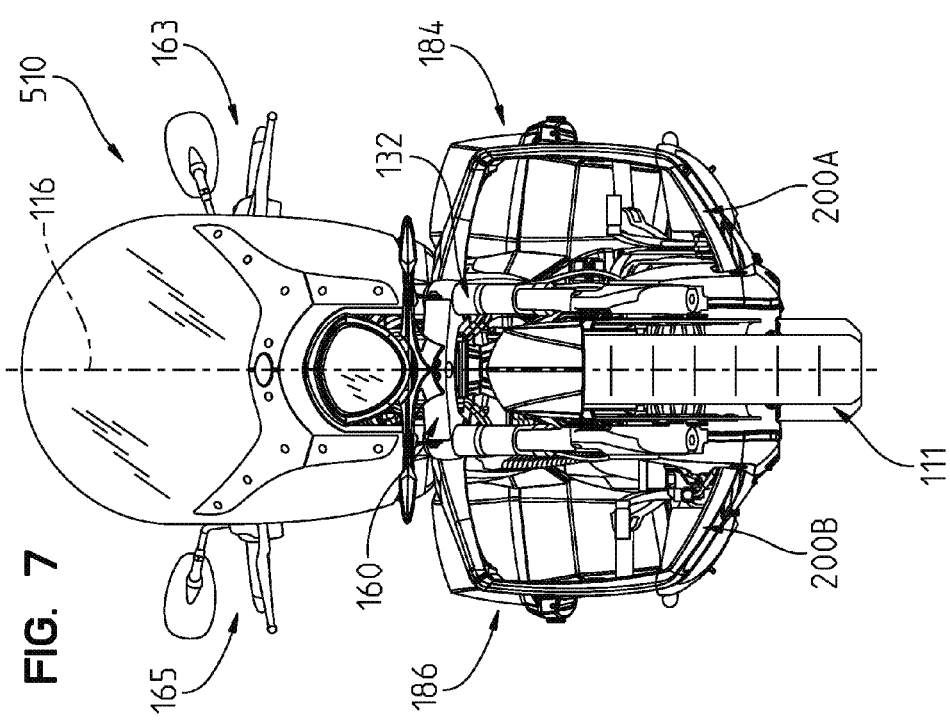

TWO-WHEELED VEHICLE

CROSS-REFERENCE TO RELATED APPLICATIONS

This application relates to U.S. patent application Ser. No. 12/478,682 filed Jun. 4, 2009, titled "TWO-WHEELED VEHICLE," and U.S. Design patent application Ser. No. 29/338,099, filed Jun. 4, 2009, titled "MOTORCYCLE,", the disclosures of which are expressly incorporated by reference herein.

FIELD

The present invention relates generally to a vehicle and in particular to a two-wheeled vehicle.

BACKGROUND

Two-wheeled vehicles, such as motorcycles, are known. It is known to have saddlebags on motorcycles. Further a variety of passenger grips are known.

SUMMARY

The present disclosure relates to two-wheeled vehicles, including motorcycles.

In an exemplary embodiment of the present disclosure, a two-wheeled vehicle is disclosed including a straddle seat having an opening through which one or both of a passenger hand grip and a driver backrest which is coupled to the frame may extend. In another exemplary embodiment of the present disclosure, a two-wheeled vehicle is disclosed including saddlebags which are supported by an exhaust system of the two-wheeled vehicle. In a further exemplary embodiment of the present disclosure, a two-wheeled vehicle is disclosed which includes a saddlebag having a cargo carrying interior having a different profile than an exterior of the saddlebag.

In an exemplary embodiment of the present disclosure, a two-wheeled vehicle is provided. The two-wheeled vehicle comprising: a front wheel rotatable about a first axis; a rear wheel generally positioned in line with the front wheel along a longitudinal plane of the two-wheeled vehicle; a frame supported by the front wheel and the rear wheel; a prime mover coupled to the frame and operably coupled to the rear wheel to power the rear wheel; a straddle seat supported by the frame, the straddle seat having a support surface including a first region for supporting a driver and a second region for supporting a passenger; and a passenger hand grip positioned in front of a rear end of the straddle seat and extendable through an opening in the straddle seat, the opening extending from a lower side of the straddle seat to an upper side of the seat. In an example, the passenger hand grip is positioned completely below the support surface of the straddle seat in a stored position and a portion of the passenger hand grip is positioned above the support surface of the straddle seat in a use position. In a variation thereof, the straddle seat and the frame cooperate to define a storage area for the passenger hand grip. In another example, the passenger hand grip is coupled to the frame independent of the straddle seat. In yet another example, the passenger hand grip includes a flexible strap which may be grasped by the passenger. A portion of the flexible strap being positionable above the support surface of the straddle seat in a use position and below the support surface of the straddle seat in a stored position. In a further example, the opening is provided in the straddle seat at a location completely within an envelope of the straddle seat. In a variation thereof, the opening is provided in the second region of the straddle seat. In still another example, a driver backrest is removably coupled to the frame through the opening. In a variation thereof, a support bracket is coupled to the frame. The support bracket being coupled to the driver backrest and the passenger hand grip at spaced apart locations. In a further variation thereof, the support bracket supports a detent member which interacts with a plurality of corresponding detent members on a support post of the driver backrest to position the driver backrest at predetermined heights.

In another exemplary embodiment of the present disclosure, a method of providing a stowable passenger hand grip of a two-wheeled vehicle having a frame and a straddle seat is provided. The method comprising the steps of coupling the passenger hand grip to the frame of the two-wheeled vehicle independent of the straddle seat; and positioning the straddle seat relative to the frame such that an opening in the straddle seat which extends from a lower side of the straddle seat to an upper side of the straddle seat is positioned proximate to the passenger hand grip. In an example, the method further comprises the steps of extending a portion of the passenger hand grip to a position above the upper side of the straddle seat to place the passenger hand grip in a use position; and positioning the portion of the passenger hand grip within the opening below the upper side of the straddle seat to place the passenger hand grip in a stored position. In another example, the method further comprises the step of removing the straddle seat from the frame without uncoupling the passenger hand grip from the frame.

In a further exemplary embodiment of the present disclosure, a two-wheeled vehicle is provided. The two-wheeled vehicle comprising a front wheel rotatable about a first axis; a rear wheel generally positioned in line with the front wheel along a longitudinal plane of the two-wheeled vehicle; a frame supported by the front wheel and the rear wheel; a prime mover coupled to the frame and operably coupled to the rear wheel to power the rear wheel; a straddle seat supported by the frame, the straddle seat having a support surface including a first region for supporting a driver and a second region for supporting a passenger; and a driver backrest positioned in front of a rear end of the straddle seat and coupled to the frame through an opening in the straddle seat, the opening extending from a lower side of the seat to an upper side of the seat. In an example, the two-wheeled vehicle further comprises a support coupled to the frame independent of the straddle seat. The support including a receiver for receiving a post of the driver backrest. In a variation thereof, the support includes a support bracket coupled to the frame; a holder coupled to the support bracket, and a detent member; the support bracket and the holder cooperating to provide the receiver and the detent member engaging the post of the driver backrest.

In yet another exemplary embodiment of the present disclosure, a two-wheeled vehicle is provided. The two-wheeled vehicle comprising a front wheel rotatable about a first axis; a rear wheel generally positioned in line with the front wheel along a longitudinal plane of the two-wheeled vehicle; a frame supported by the front wheel and the rear wheel; a straddle seat supported by the frame; an internal combustion engine coupled to the frame and operably coupled to the rear wheel to power the rear wheel; an exhaust system coupled at a first end to the internal combustion engine and extending rearward of a vertical plane passing through an axis of rotation of the rear wheel; and a saddlebag positioned on a first side of the longitudinal plane, the first saddlebag supported by the exhaust system. In an example, the frame includes a rear cast frame member and a support bracket extending down from and coupled to the rear cast frame member, the support bracket coupling a rear portion of the exhaust system to the frame. In a variation thereof, the support bracket includes a wing portion which is coupled to the exhaust system. In another example, the two-wheeled vehicle further comprises a saddlebag support supported by the exhaust system. The saddlebag support being positioned between the exhaust system and the saddlebag. In a variation thereof, the saddlebag support is coupled to the exhaust system. In another variation thereof, the saddlebag support includes a heat isolation member which is contacting a lower side of the first saddlebag. In still another variation thereof, the saddlebag includes a locator which locates the saddlebag relative to the saddlebag support. In a further variation thereof, the locator includes a channel that receives a portion of the saddlebag support and a first retainer and a second retainer which extend down from the saddlebag along a first side and a second side of the saddlebag support, respectively. In yet another example, the two-wheeled vehicle further comprises a side bracket coupled to the frame; and a rear fender covering a portion of the rear wheel, the side bracket being positioned between the saddlebag and the rear fender and keeps the saddlebag spaced apart from the rear fender. In a variation thereof, the saddlebag is coupled to the side bracket through a plurality of quick connect fasteners which are actuatable from an interior of the saddlebag.

In yet still another exemplary embodiment of the present disclosure, a two-wheeled vehicle is provided. The two-wheeled vehicle comprising a front wheel rotatable about a first axis; a rear wheel generally positioned in line with the front wheel along a longitudinal plane of the two-wheeled vehicle; a frame supported by the front wheel and the rear wheel; a straddle seat supported by the frame; a prime mover coupled to the frame and operably coupled to the rear wheel to power the rear wheel; and a saddlebag positioned on a first side of the longitudinal plane, the saddlebag having a cargo carrying interior accessible through a top portion of the saddlebag. An extent of a bottom of the cargo carrying interior along a first plane parallel to the longitudinal plane is up to about 90 percent of a lower extent of an exterior of the saddlebag along the first plane. In an example, the extent of the bottom of the cargo carrying interior along the first plane parallel to the longitudinal plane is at least about 50 percent of the lower extent of the exterior of the saddlebag along the first plane. In another example, the extent of the bottom of the cargo carrying interior along the first plane parallel to the longitudinal plane is up to about 75 percent of the lower extent of the exterior of the saddlebag along the first plane.

In still another exemplary embodiment of the present disclosure, a two-wheeled vehicle is provided. The two-wheeled vehicle comprising a front wheel rotatable about a first axis; a rear wheel generally positioned in line with the front wheel along a longitudinal plane of the two-wheeled vehicle; a frame supported by the front wheel and the rear wheel; a straddle seat supported by the frame; a prime mover coupled to the frame and operably coupled to the rear wheel to power the rear wheel; and a saddlebag positioned on a first side of the longitudinal plane, the saddlebag having a cargo carrying interior accessible through a top portion of the saddlebag and an open bottom portion. In an example, the open bottom portion extends up at least one wall of the cargo carrying interior of the saddlebag. In another example, the open bottom portion extends completely up at least one wall of the cargo carrying interior of the saddlebag. In yet another example, the cargo carrying interior and the open bottom are molded as one piece. In still another example, the saddlebag is supported by the frame on a left side of the longitudinal plane of the two-wheeled vehicle and an exterior of the saddlebag has a first profile defined by a second longitudinal plane that is parallel to the longitudinal plane and the cargo carrying interior of the saddlebag has a second profile defined by the second longitudinal plane, the second profile differing from the first profile. In a variation thereof, the second profile includes a front wall and a rear wall, the front wall also defines a front profile of the first profile, the front profile of the first profile matches a profile of the front wall of the second profile. In a further variation thereof, the open bottom portion separates a lower portion of the rear wall of the second profile from a rear profile of the first profile.

The above mentioned and other features, and the manner of attaining them, will become more apparent and will be better understood by reference to the following description of embodiments taken in conjunction with the accompanying drawings.

BRIEF DESCRIPTION OF THE DRAWINGS

FIG. 7 illustrates a front view of the two-wheeled vehicle of FIG. 1;

FIG. 8 illustrates a rear view of the two-wheeled vehicle of FIG. 1;

Corresponding reference characters indicate corresponding parts throughout the several views. Unless stated otherwise the drawings are proportional.

DETAILED DESCRIPTION OF THE DRAWINGS

Figure 1:
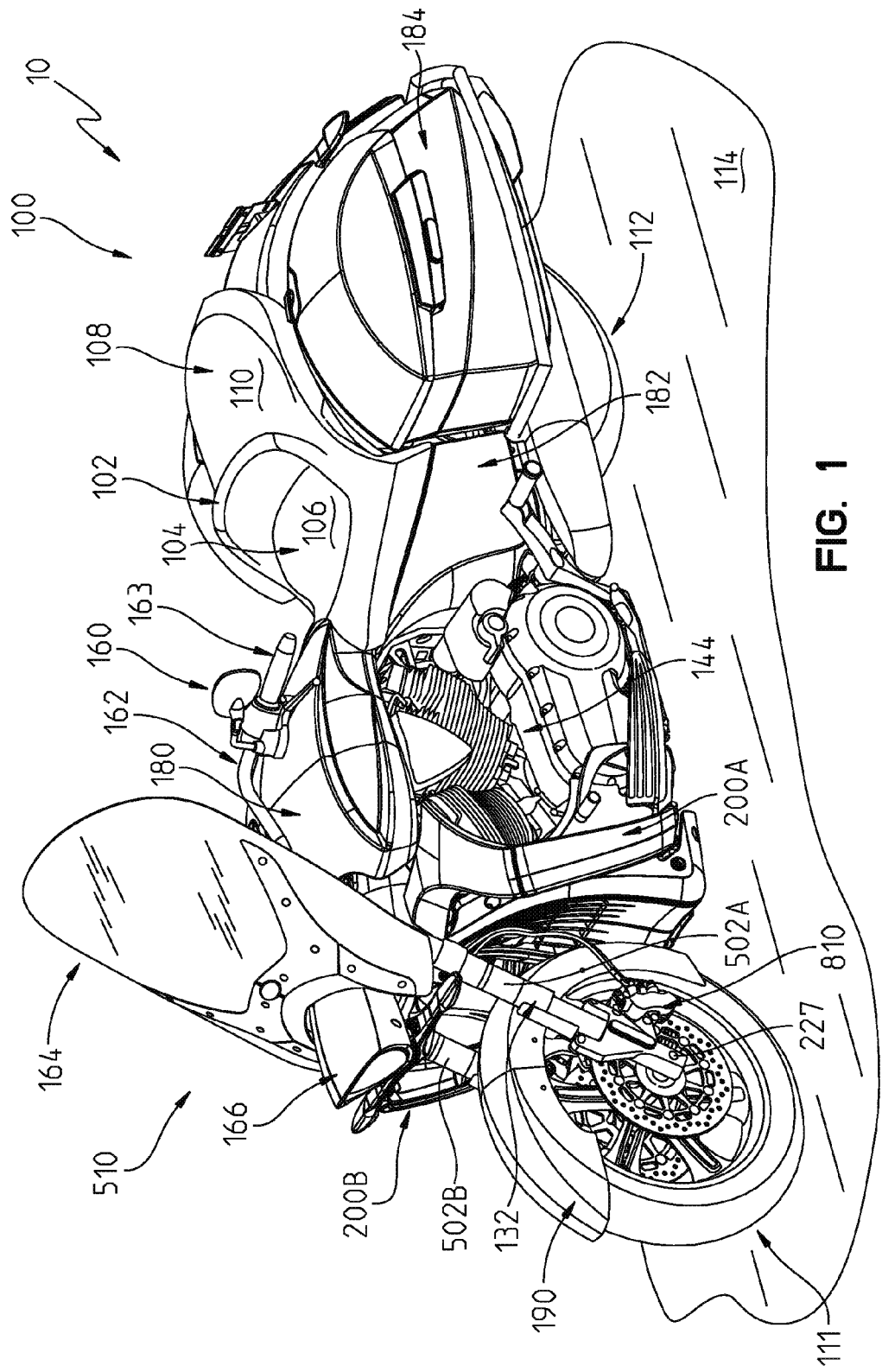
FIG. 1 illustrates a front, left side, perspective view of an illustrative embodiment of a two-wheeled vehicle.
Figure 2:
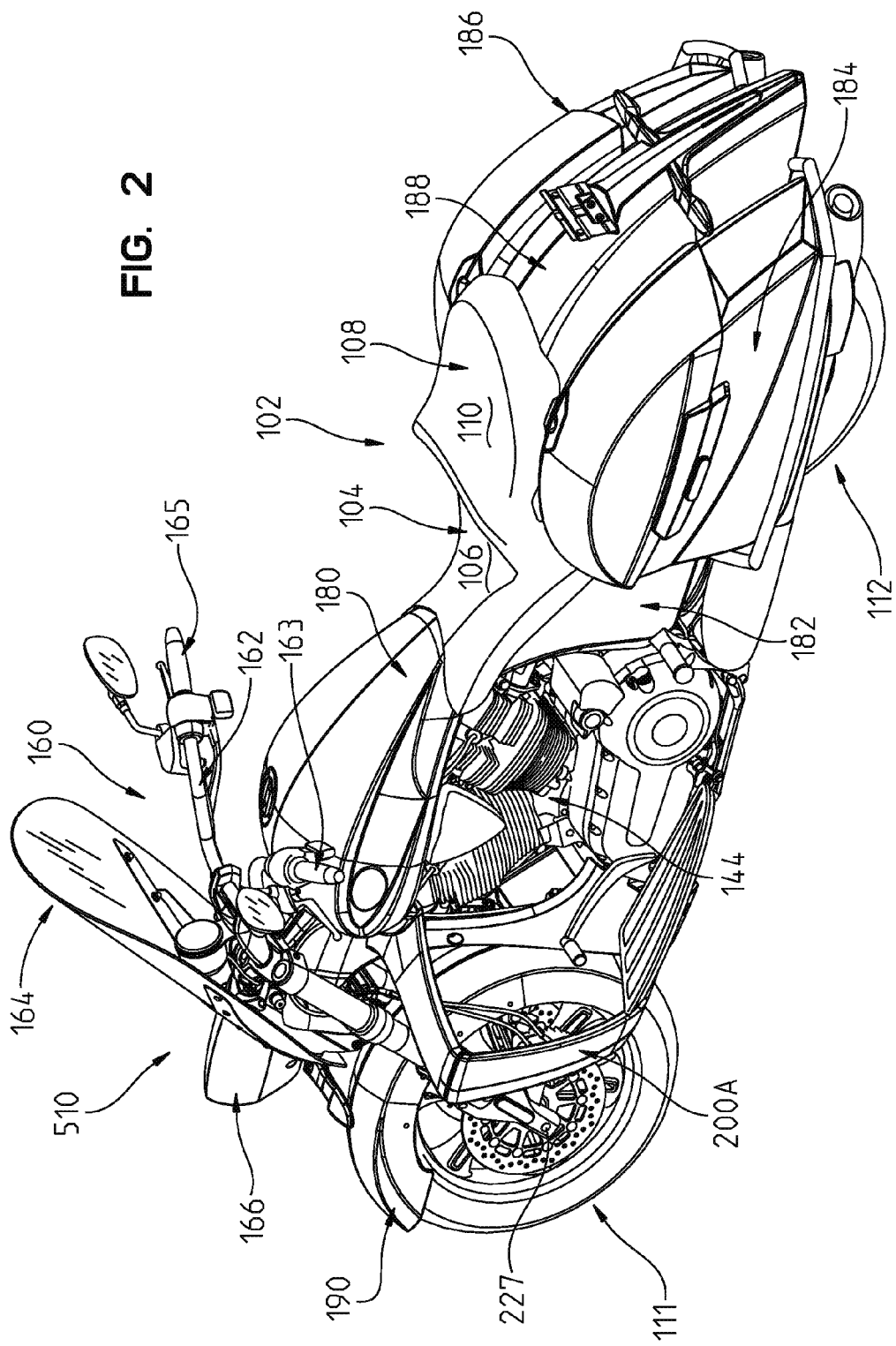
FIG. 2 illustrates a rear, left side, perspective view of the two-wheeled vehicle of FIG. 1.

The embodiments disclosed below are not intended to be exhaustive or to limit the invention to the precise forms disclosed in the following detailed description. Rather, the embodiments are chosen and described so that others skilled in the art may utilize their teachings. While the present invention primarily involves a motorcycle, it should be understood, that the invention may have application to other types of vehicles such as all-terrain vehicles, watercraft, utility vehicles, scooters, golf carts, three-wheeled vehicles, and mopeds.

Throughout this disclosure, two embodiments of a two-wheeled vehicle 100 are disclosed. Referring generally to FIGS. 1-9, a first illustrative embodiment 10 of two-wheeled vehicle 100 is shown. Referring generally to FIGS. 10-17, a second illustrative embodiment 20 of two-wheeled vehicle 100 is shown. Vehicle 10 is a motorcycle without a front fairing. The steering system of vehicle 10 supports a headlight assembly and a removable front windshield. Vehicle 20 is a motorcycle with a front fairing. The steering assembly of vehicle 20 supports the fairing assembly. Both of vehicle 10 and vehicle 20 share many similarities and the following disclosure generally applies to both vehicle 10 and vehicle 20 even though only discussed relative to one of vehicle 10 and vehicle 20. In general vehicle 10 and vehicle 20 differ in the components supported by the steering assembly.

Additional details about vehicle 100 are disclosed in U.S. patent application Ser. No. 12/478,682 filed Jun. 4, 2009, titled "TWO-WHEELED VEHICLE," and U.S. Design patent application Ser. No. 29/338,099, filed Jun. 4, 2009 titled "MOTORCYCLE,", the disclosures of which are expressly incorporated by reference herein.

Referring to FIG. 1, vehicle 10 as illustrated is a motorcycle including a straddle seat 102 for supporting an operator in position 104 on a support surface 106 and a passenger in position 108 on a support surface 110. In the illustrated embodiment, the support surface 110 corresponding to position 108 is elevated relative to the support surface 106 corresponding to position 104. Vehicle 10 further includes a front ground engaging member, illustratively wheel 111, and a rear ground engaging member, illustratively wheel 112. Vehicle 10 travels relative to the ground 114 on front wheel 111 and rear wheel 112.

Figure 3:
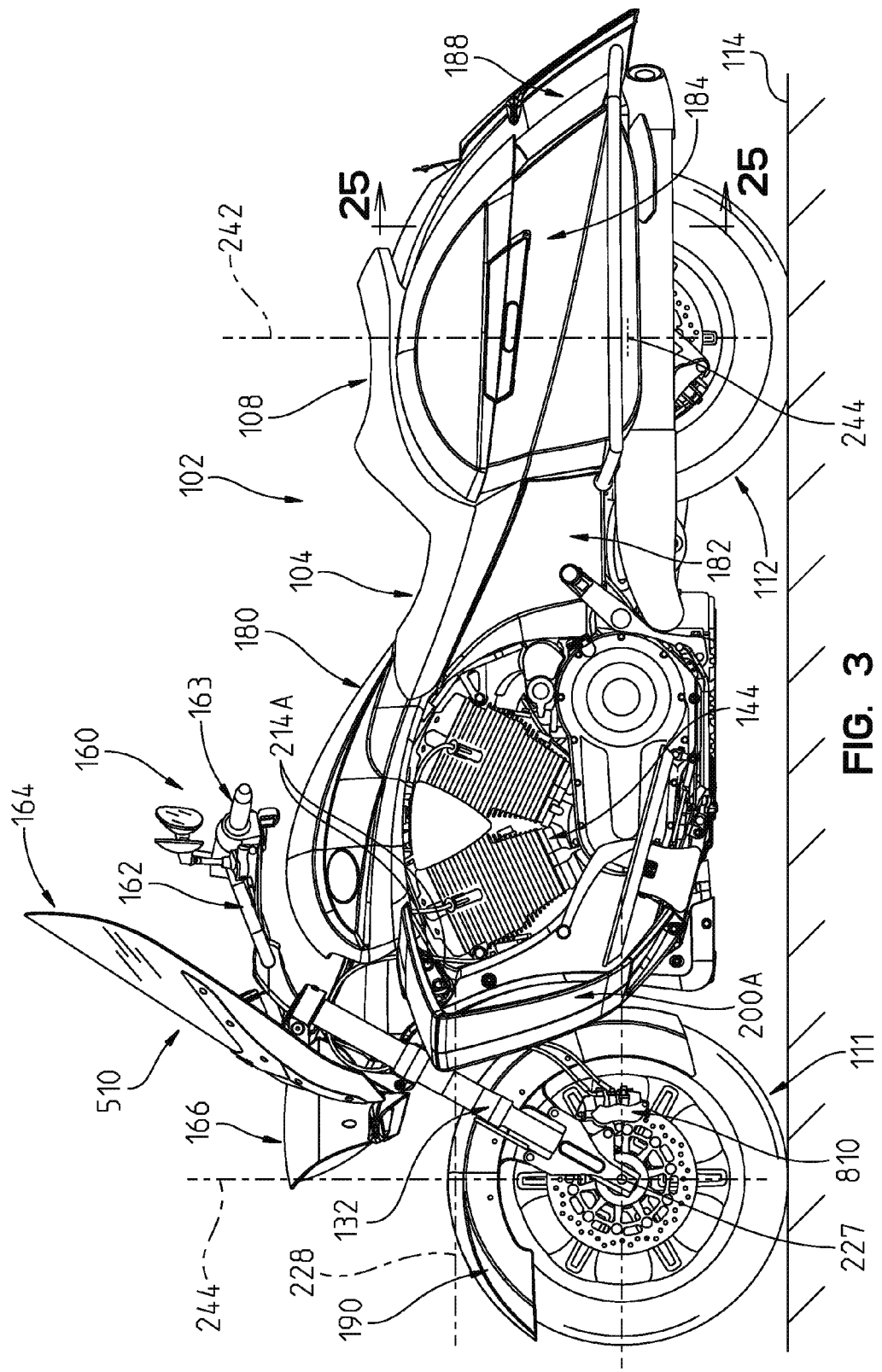
FIG. 3 illustrates a left side view of the two-wheeled vehicle of FIG. 1.
Figure 4:
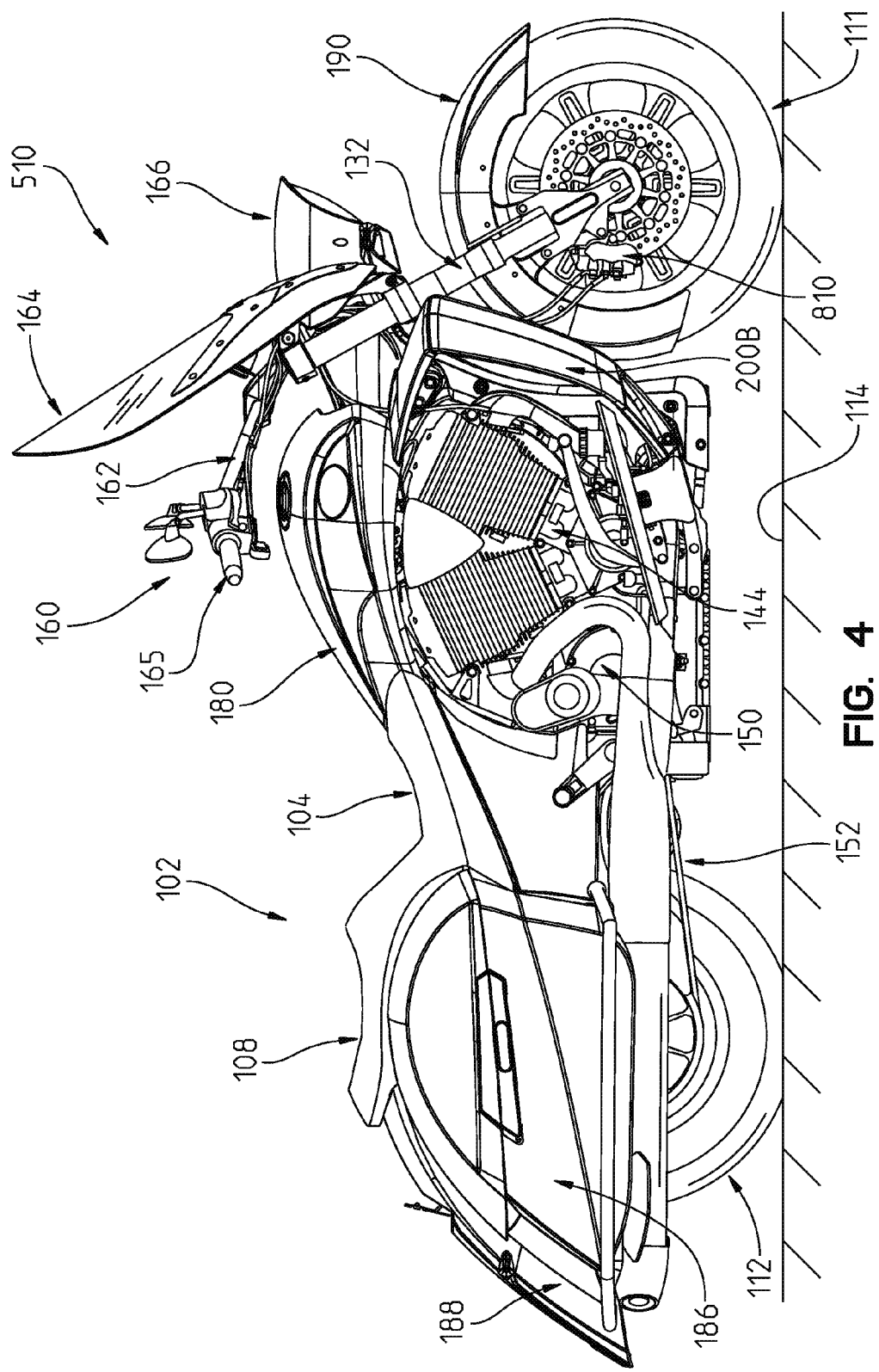
FIG. 4 illustrates a right side view of the two-wheeled vehicle of FIG. 1.
Figure 5:
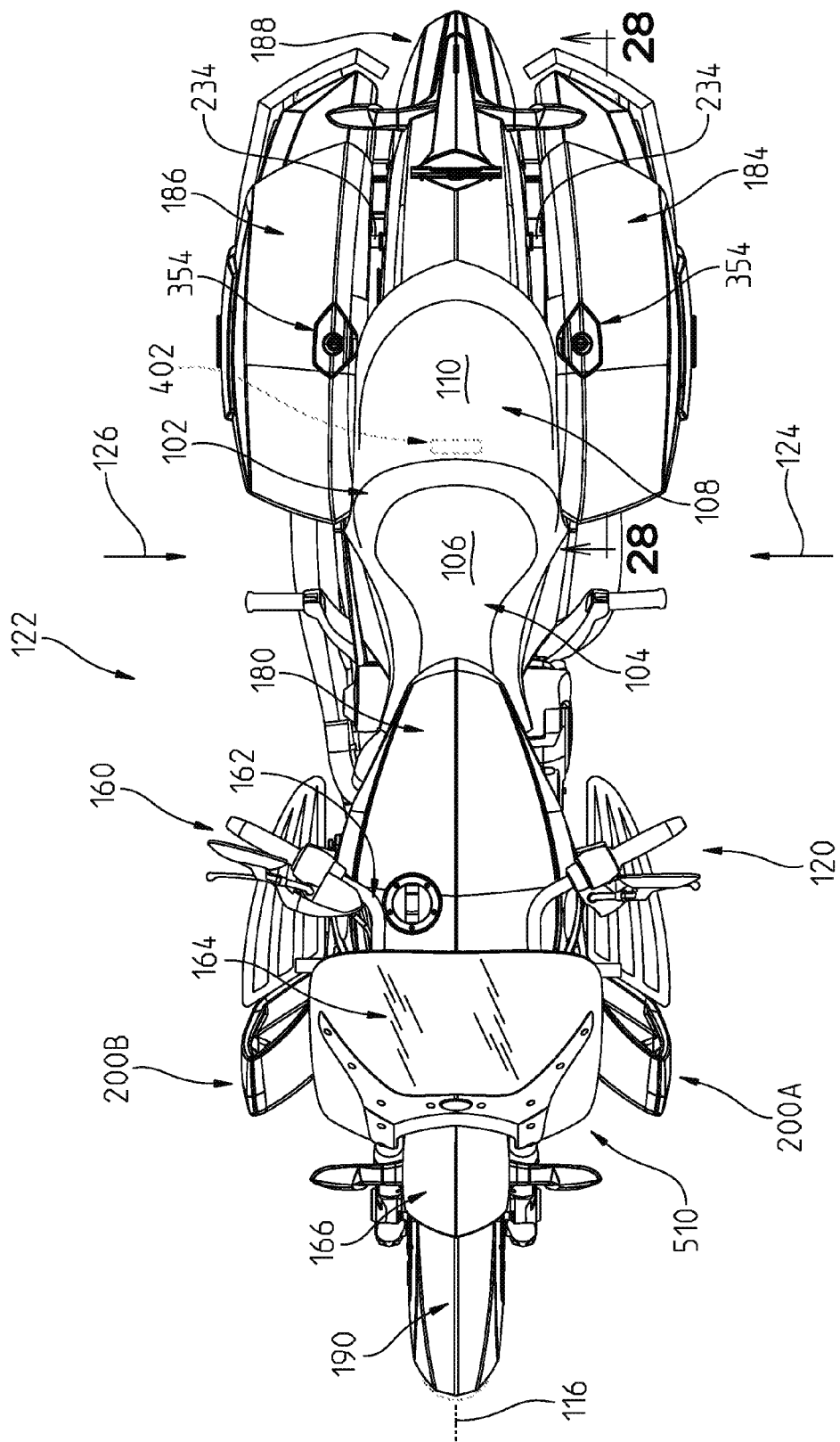
FIG. 5 illustrates a top view of the two-wheeled vehicle of FIG. 1.
Figure 6:
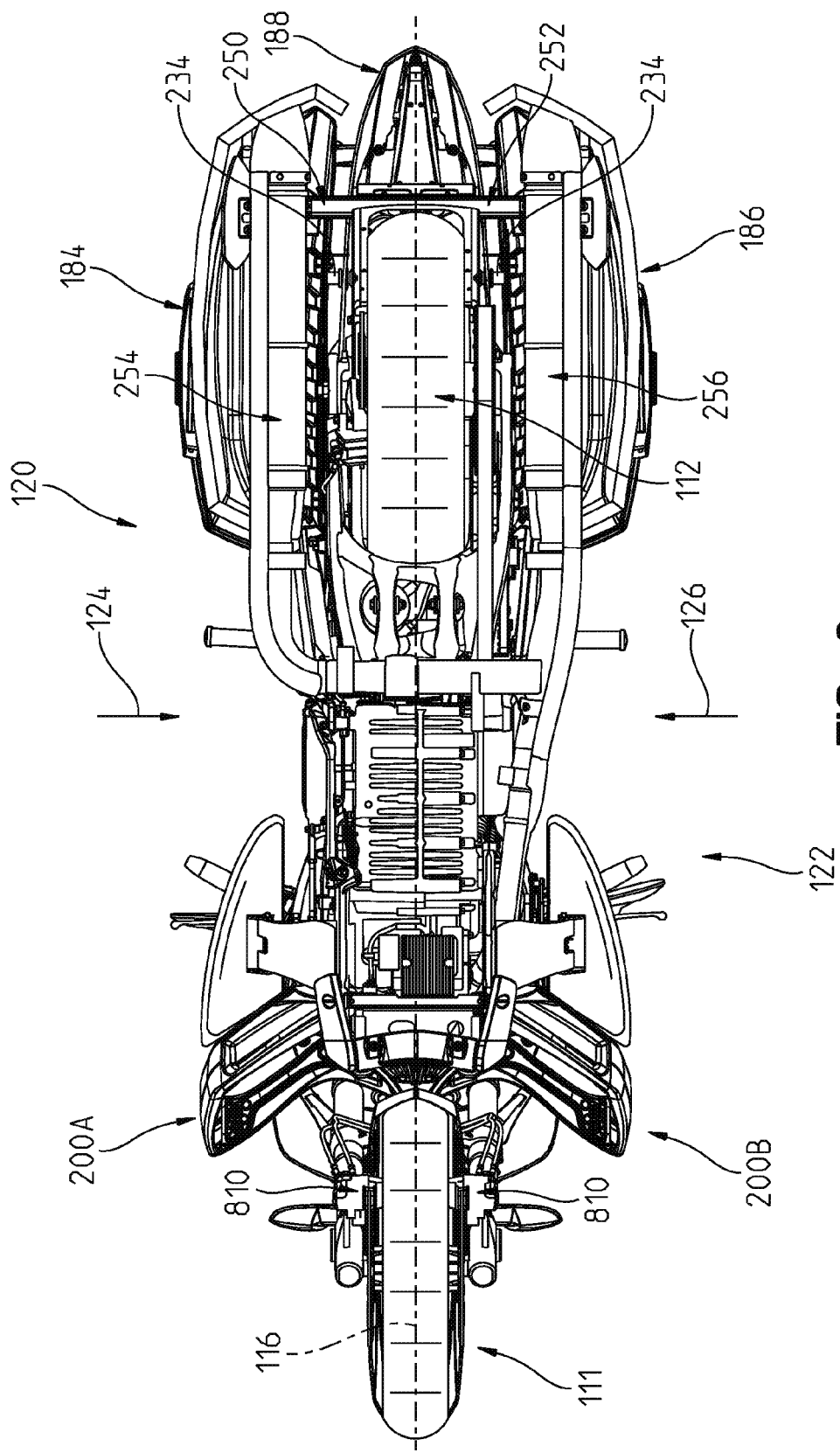
FIG. 6 illustrates a bottom view of the two-wheeled vehicle of FIG. 1.

Referring to FIG. 5, in one embodiment, front wheel 111 and rear wheel 112 are generally arranged along a centerline plane 116 of vehicle 10. A left side portion 120 of vehicle 10 is positioned to a first side of centerline plane 116 and a right side portion 122 of vehicle 10 is positioned to a second side of centerline plane 116. A left side view of vehicle 10 along direction 124 is shown in FIG. 3. A right side view of vehicle 10 along direction 126 is shown in FIG. 4. Directions 124 and 126 are both perpendicular to centerline plane 116.

Figure 19:
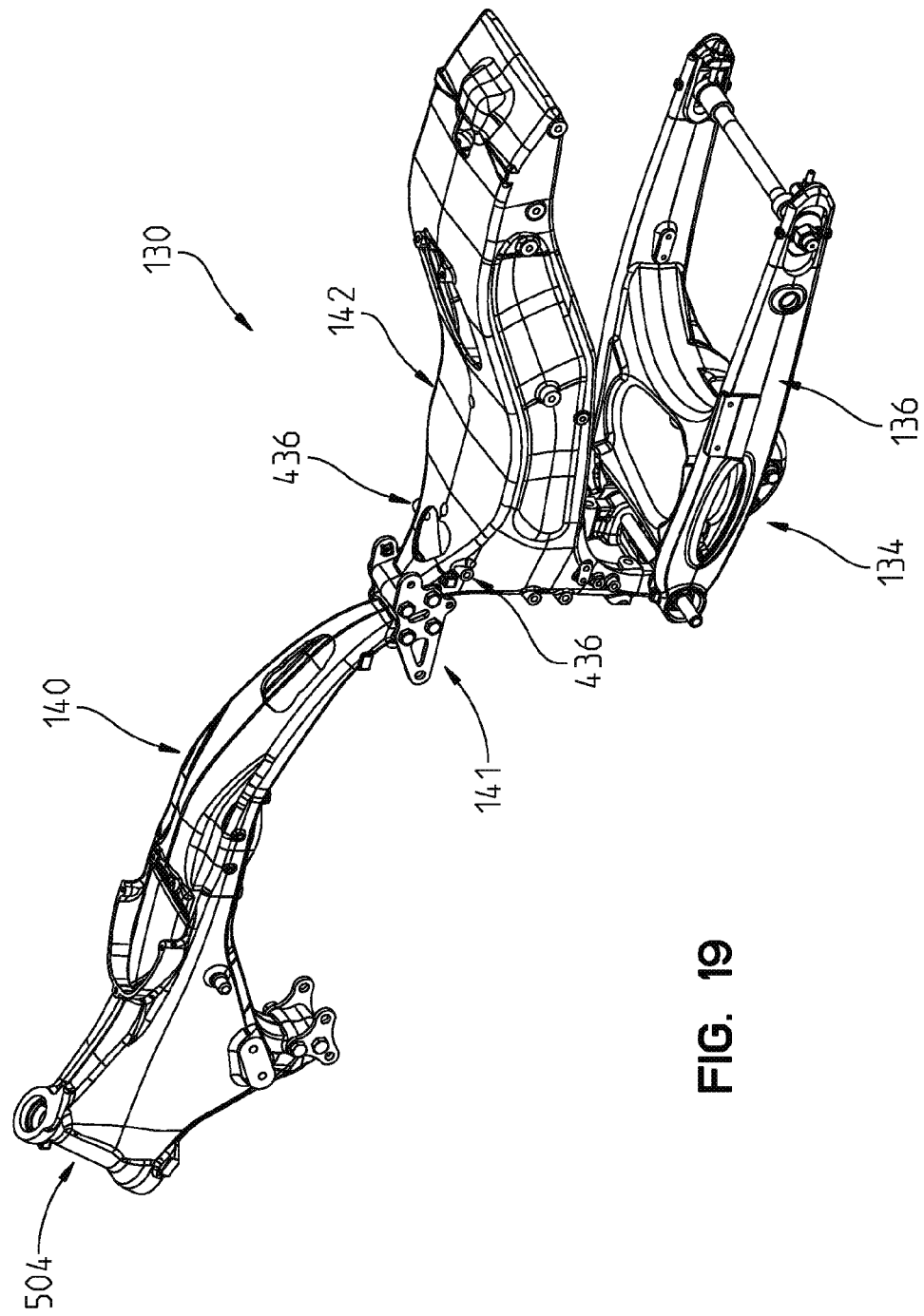
FIG. 19 illustrates a perspective view of the frame of both the vehicle of FIG. 1 and the vehicle of FIG. 10.

Referring to FIG. 19, vehicle 10 includes a frame 130 which is supported by front wheel 111 through a front suspension 132 (see FIG. 1) and by rear wheel 112 through a rear suspension 134. A rear swing arm 136 of rear suspension 134 is shown. Additional details regarding rear suspension 134 are disclosed in U.S. patent application Ser. No. 11/624,142, titled REAR SUSPENSION FOR A TWO-WHEELED VEHICLE, the disclosure of which is expressly incorporated by reference herein.

Frame 130 includes a front frame member 140 and a rear frame member 142. Front frame member 140 and rear frame member 142 are coupled together through a pair of brackets 141. In one embodiment, both front frame member 140 and rear frame member 142 are cast one-piece components. In one example, the front frame member 140 and the rear frame member 142 are cast aluminum.

Frame 130 supports a prime mover 144 which powers the movement of vehicle 10. In the illustrated embodiment, prime mover 144 is a v-twin spark-ignition gasoline engine available from Polaris Industries, Inc. located at 2100 Highway 55 in Medina, Minn. 55340. Other exemplary prime movers include other arrangements of a spark-ignition gasoline engine, an electric motor, a hybrid spark-ignition engine, and other suitable torque-generating machines which are operable for powering the movement of vehicle 10. In one embodiment, prime mover 144 is suspended from front frame member 140. In one embodiment, front frame member 140 serves as an air box for prime mover 144.

Referring to FIG. 4, rear wheel 112 is coupled to a drive shaft of a transmission 150 through a belt 152. Transmission 150 is operatively coupled to prime mover 144 such that prime mover 144 may provide power to rear wheel 112. In alternative embodiments, rear wheel 112 is coupled to the drive shaft of transmission 150 through a chain drive or other suitable couplings. The drive arrangement in the illustrated embodiment is comprised of a six speed overdrive constant mesh transmission with a carbon fiber reinforced belt available from Polaris Industries, Inc. In alternative embodiments, the transmission is a continuous variable transmission or a continuous variable transmission in combination with a shiftable transmission having one or more forward settings to move vehicle 100 forward and one or more reverse settings to moving vehicle 100 in reverse. In one embodiment, the transmission is of the form disclosed in U.S. patent application Ser. No. 11/636,077, assigned to Polaris Industries, Inc., titled "AUTOMATIC MOTORCYCLE," the disclosure of which is expressly incorporated by reference herein.

Figure 9:
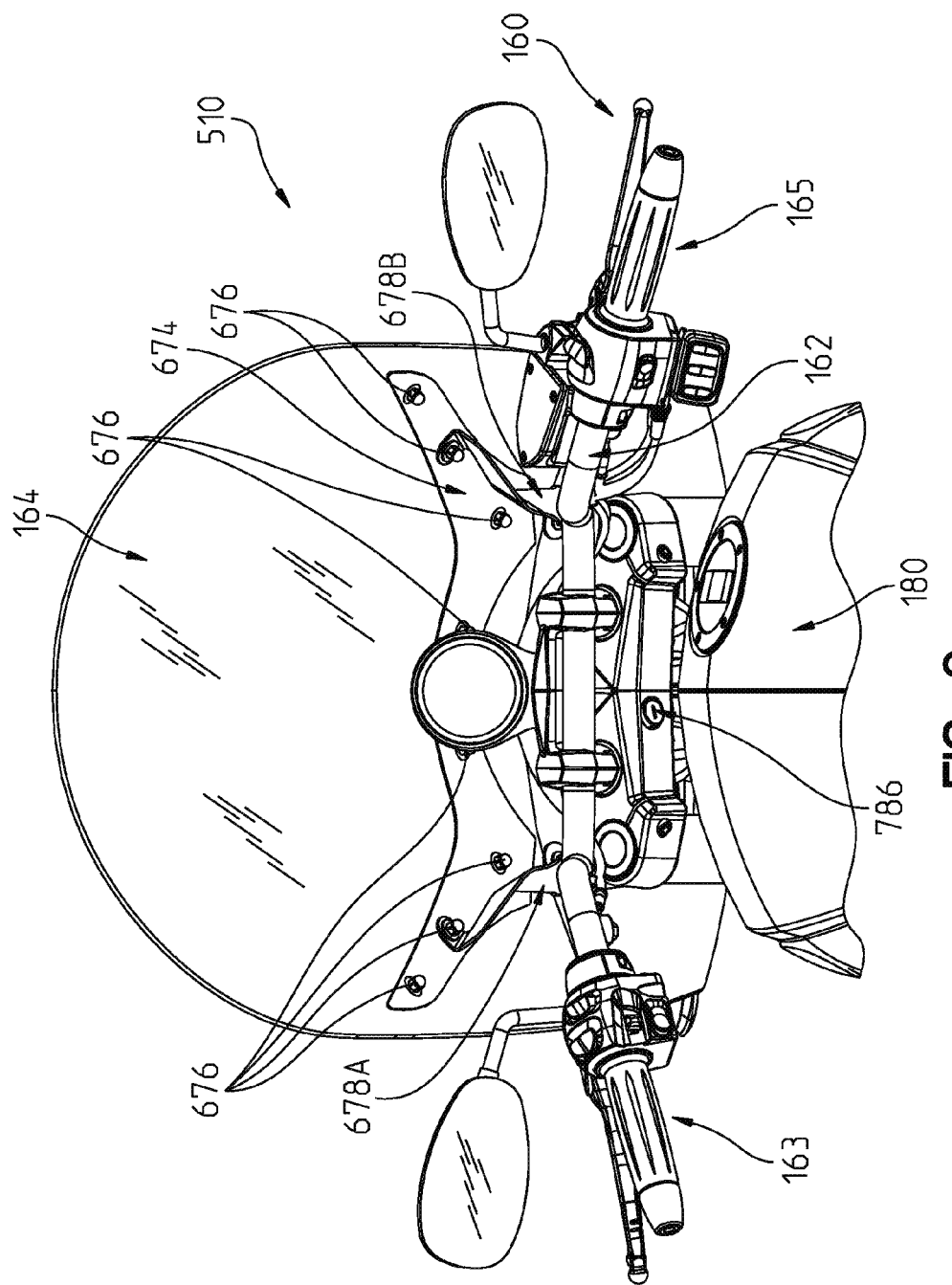
FIG. 9 illustrates a view from the perspective of an operator of the vehicle FIG. 1 positioned on a seat of the vehicle.
Figure 10:
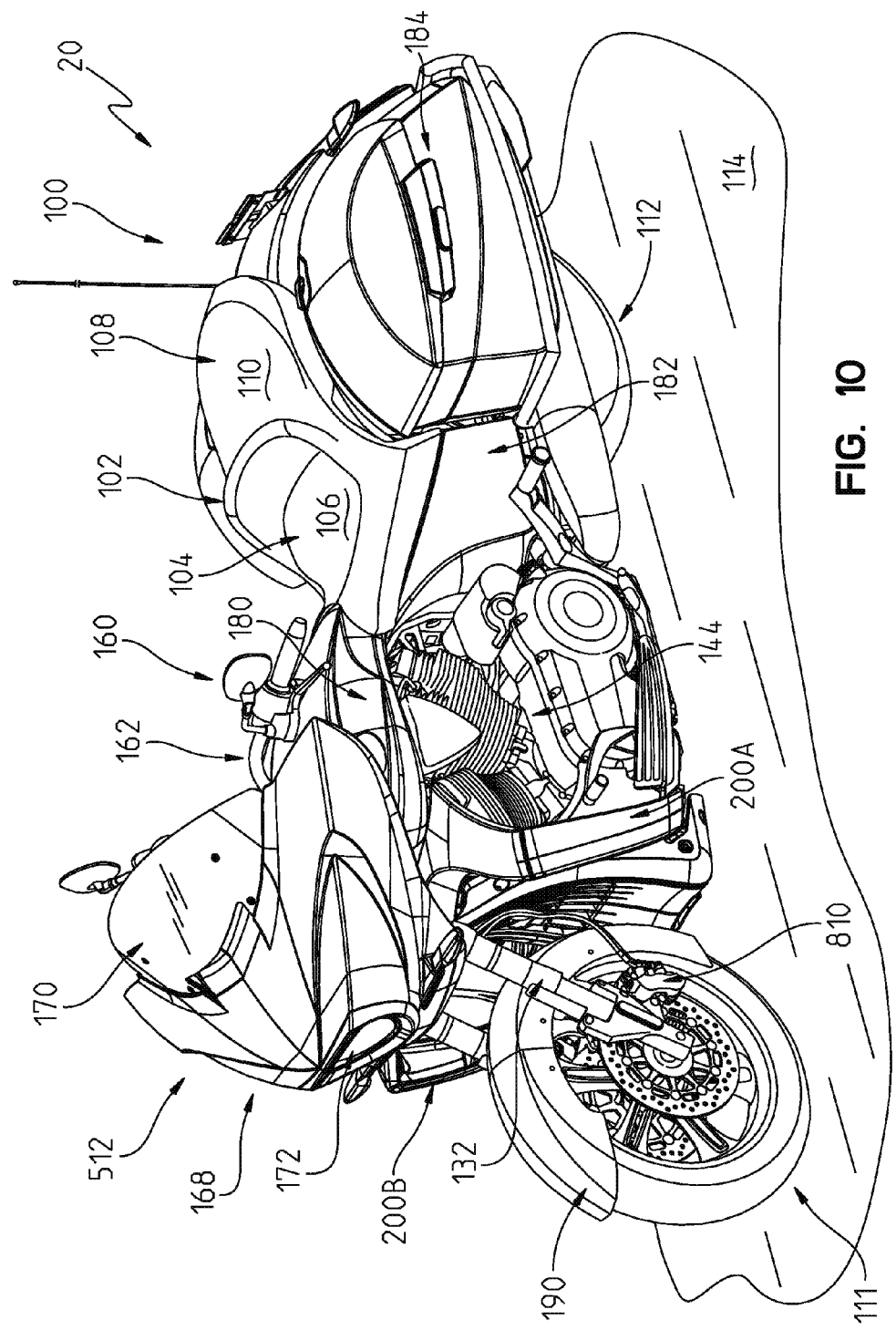
FIG. 10 illustrates a front, left side, perspective view of another illustrative embodiment of a two-wheeled vehicle.
Figure 11:
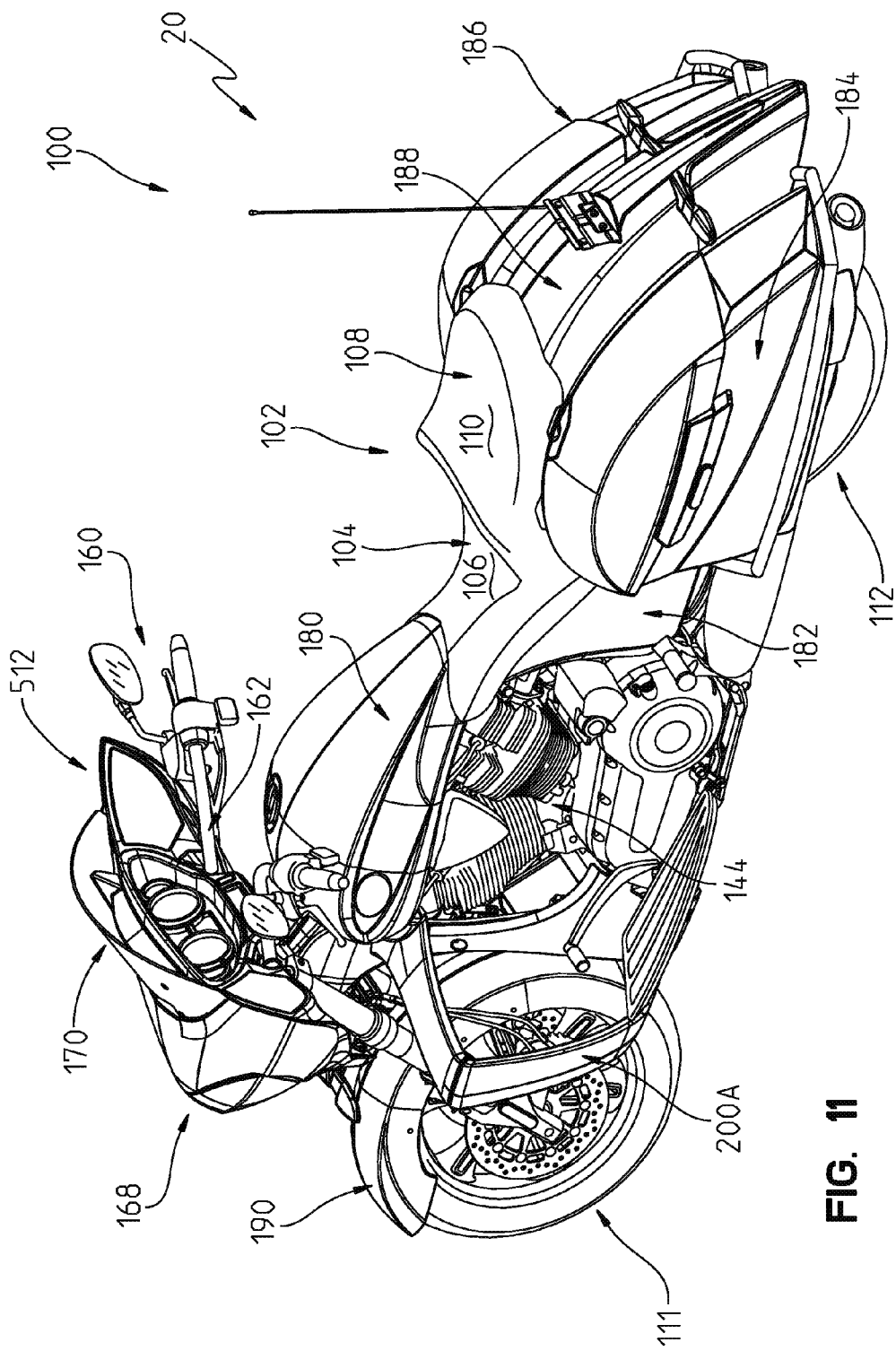
FIG. 11 illustrates a rear, left side, perspective view of the two-wheeled vehicle of FIG. 10.
Figure 12:
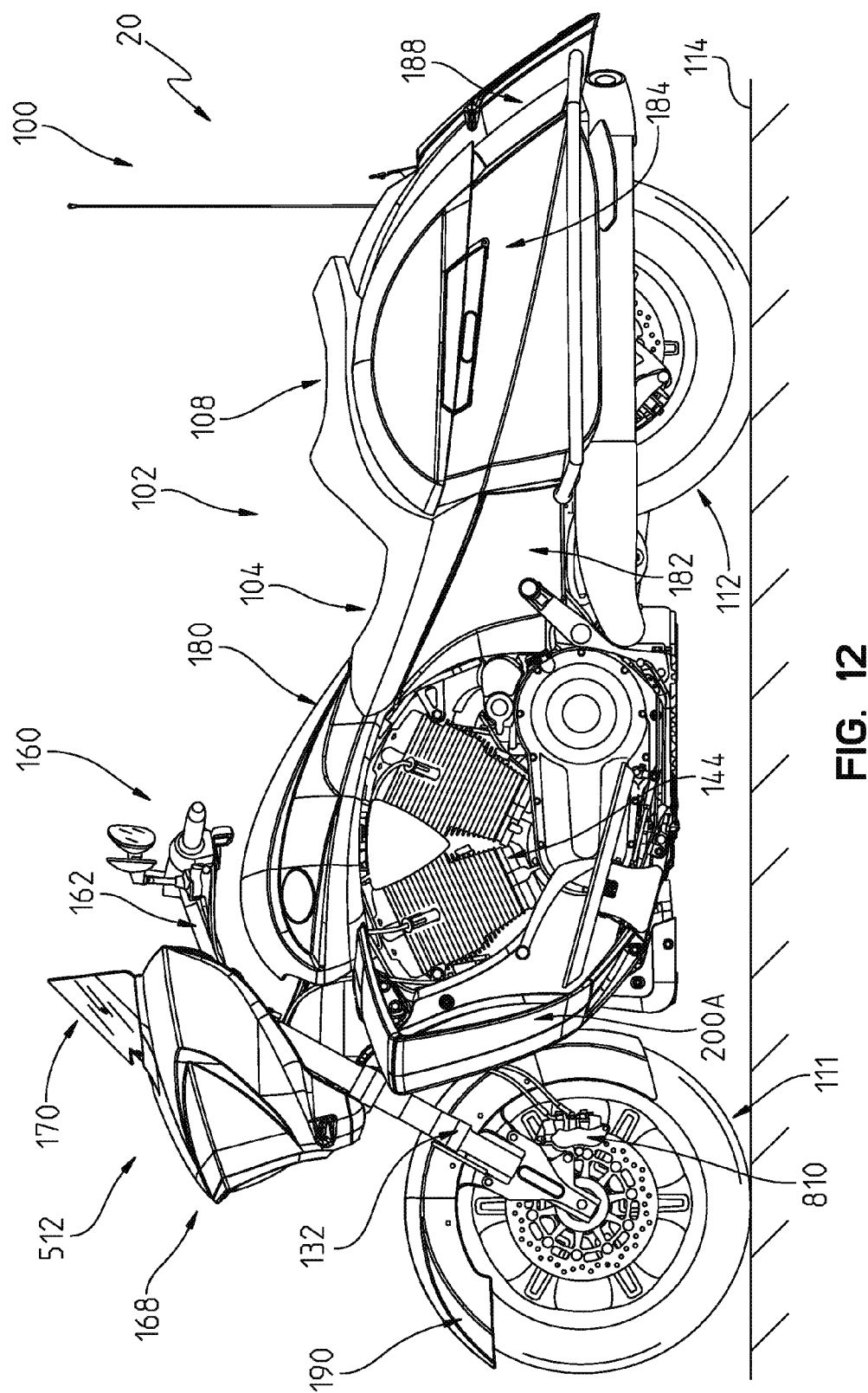
FIG. 12 illustrates a left side view of the two-wheeled vehicle of FIG. 10.
Figure 13:
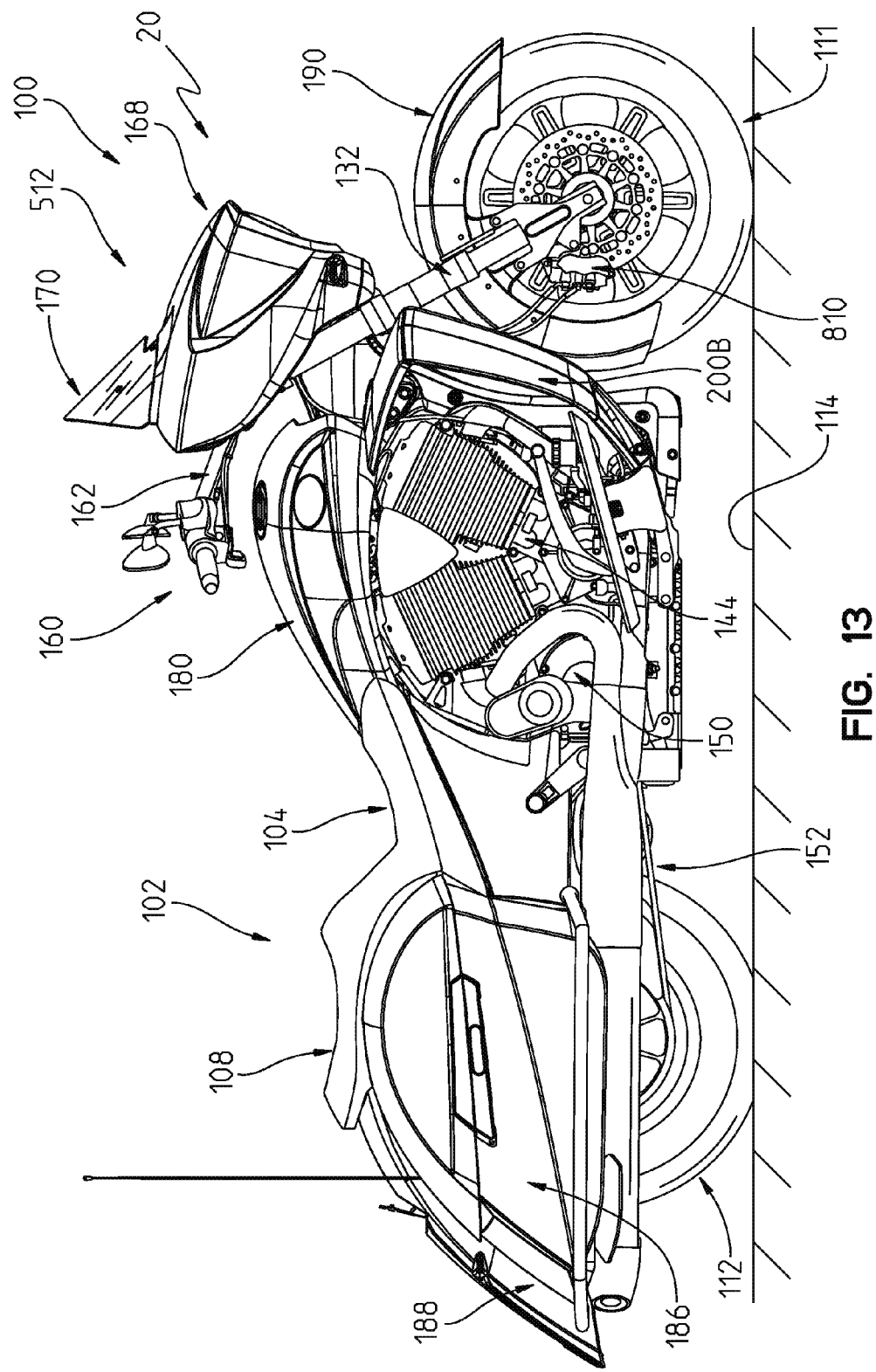
FIG. 13 illustrates a right side view of the two-wheeled vehicle of FIG. 10.
Figure 14:
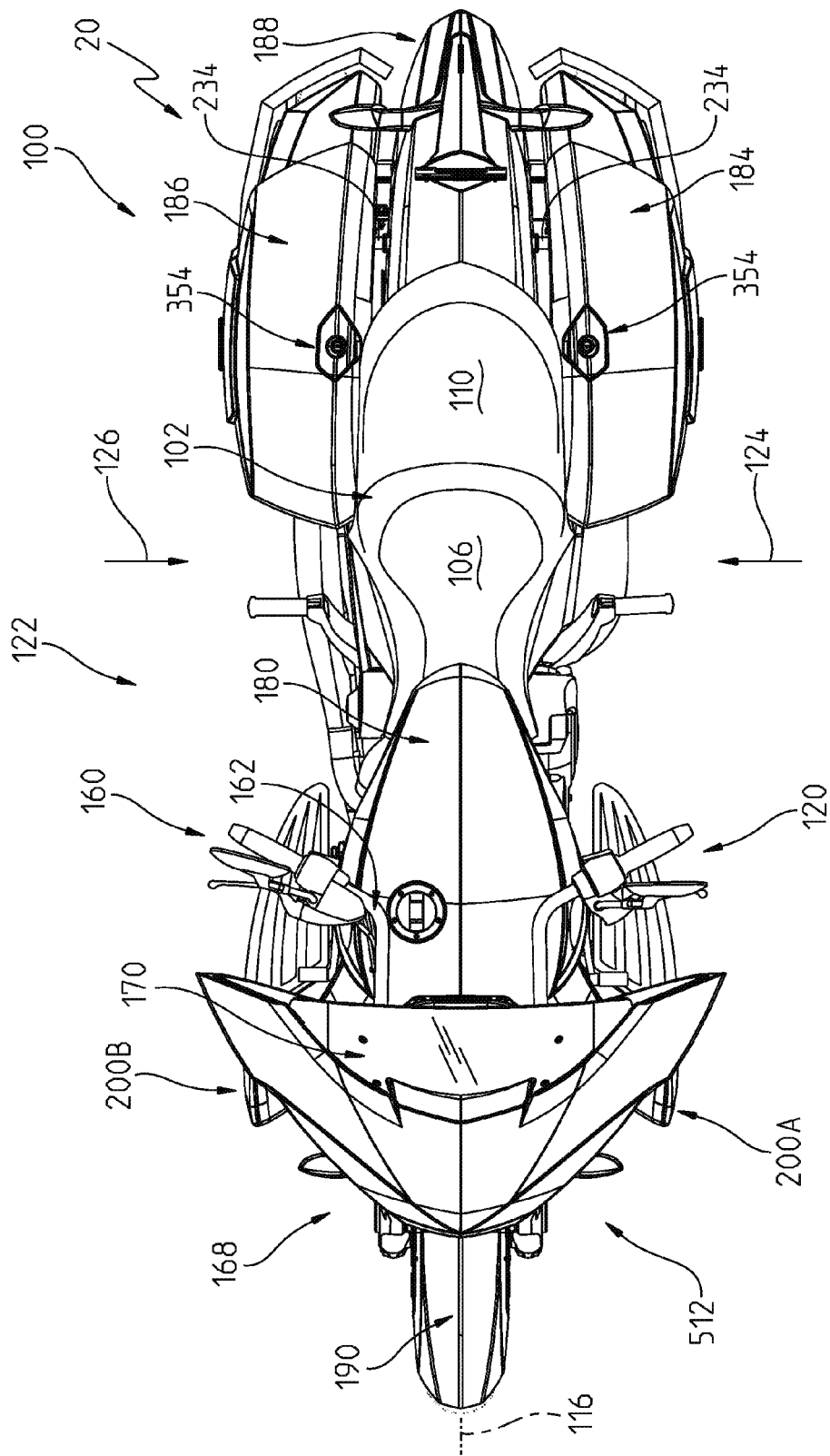
FIG. 14 illustrates a top view of the two-wheeled vehicle of FIG. 10.
Figure 15:
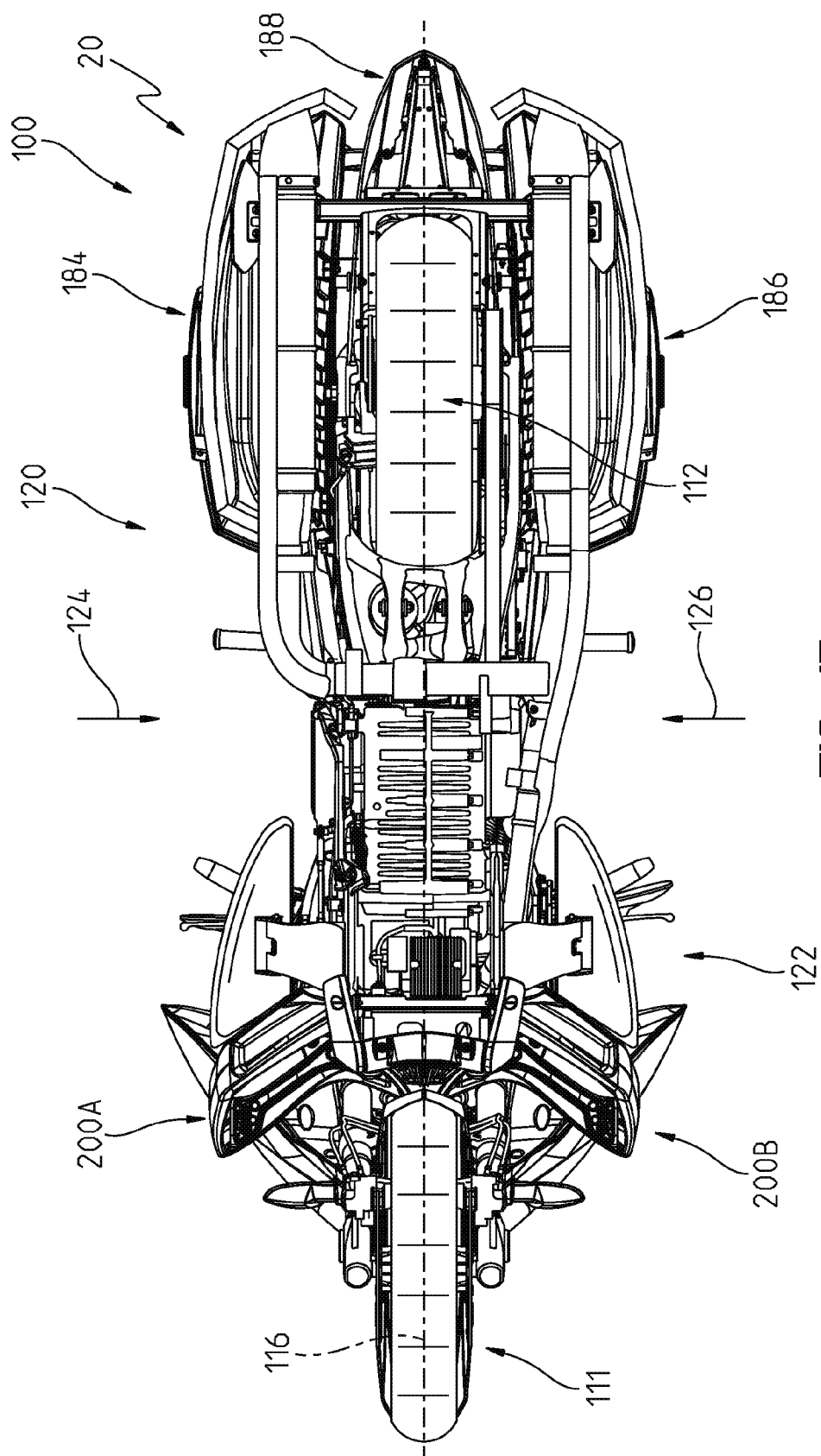
FIG. 15 illustrates a bottom view of the two-wheeled vehicle of FIG. 10.
Figure 17:
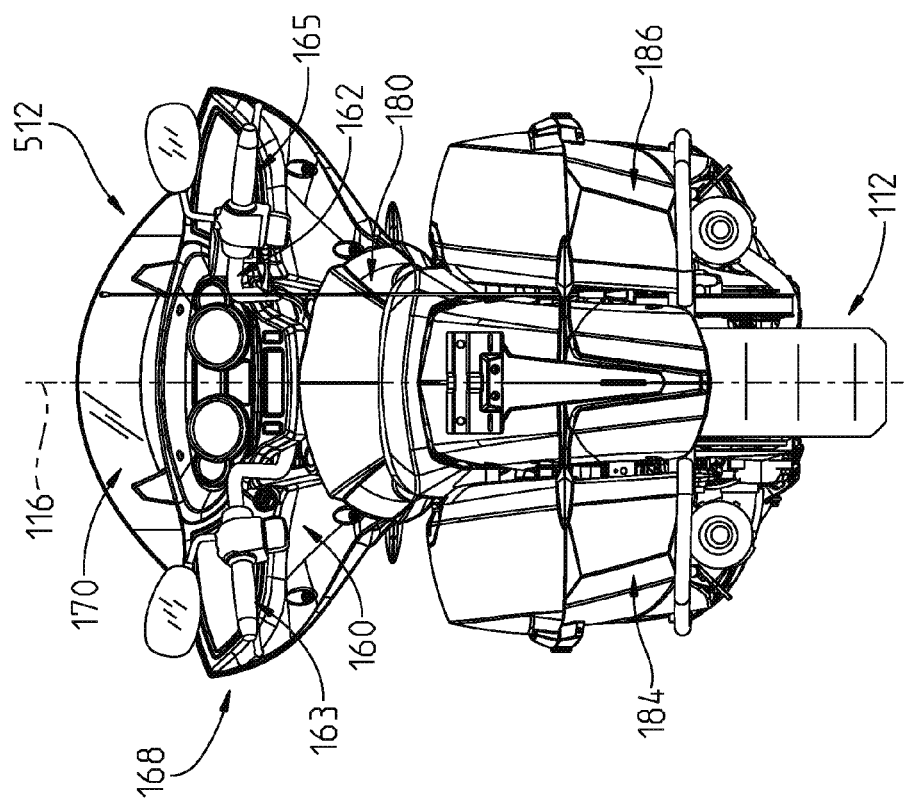
FIG. 17 illustrates a rear view of the two-wheeled vehicle of FIG. 10.
Figure 16:
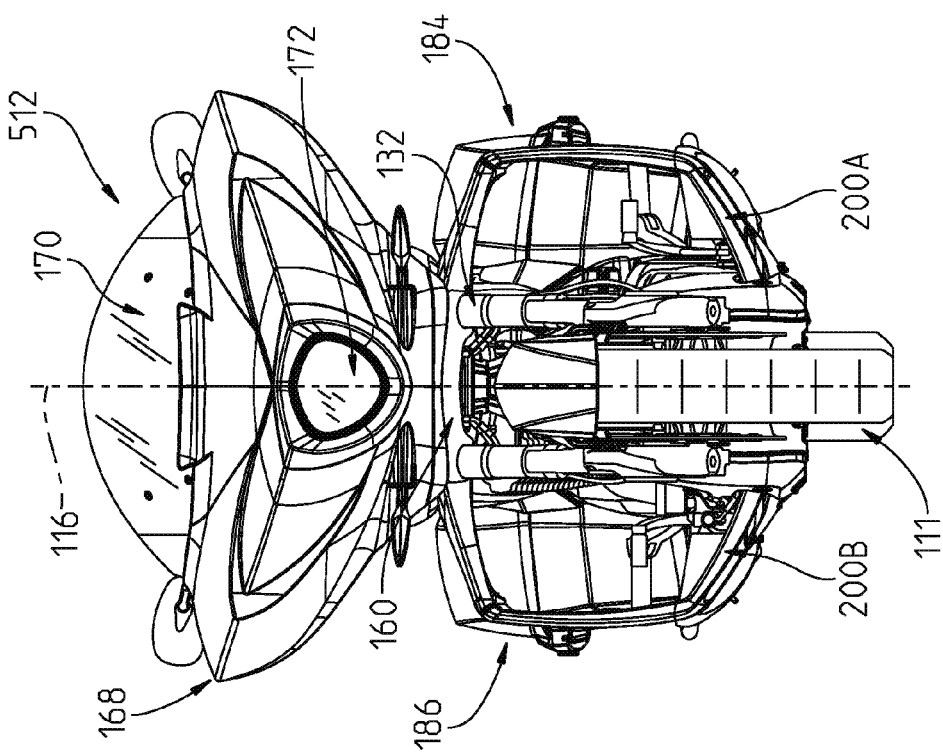
FIG. 16 illustrates a front view of the two-wheeled vehicle of FIG. 10.

Returning to FIG. 1, front wheel 111 is coupled to a steering assembly 160. Referring to FIG. 9, steering assembly 160 is shown. Steering assembly 160 includes handlebars 162 which include a left and right grip 163, 165. As is known in the art, each of left grip 163 and right grip 165 may be configured to control and/or have associated therewith one or more components to control the prime mover 144, the transmission 150 and/or the front and/or rear brakes of vehicle 100. Handlebars 162 may be moved by an operator to rotate front wheel 111 either to the left or the right.

Figure 18:
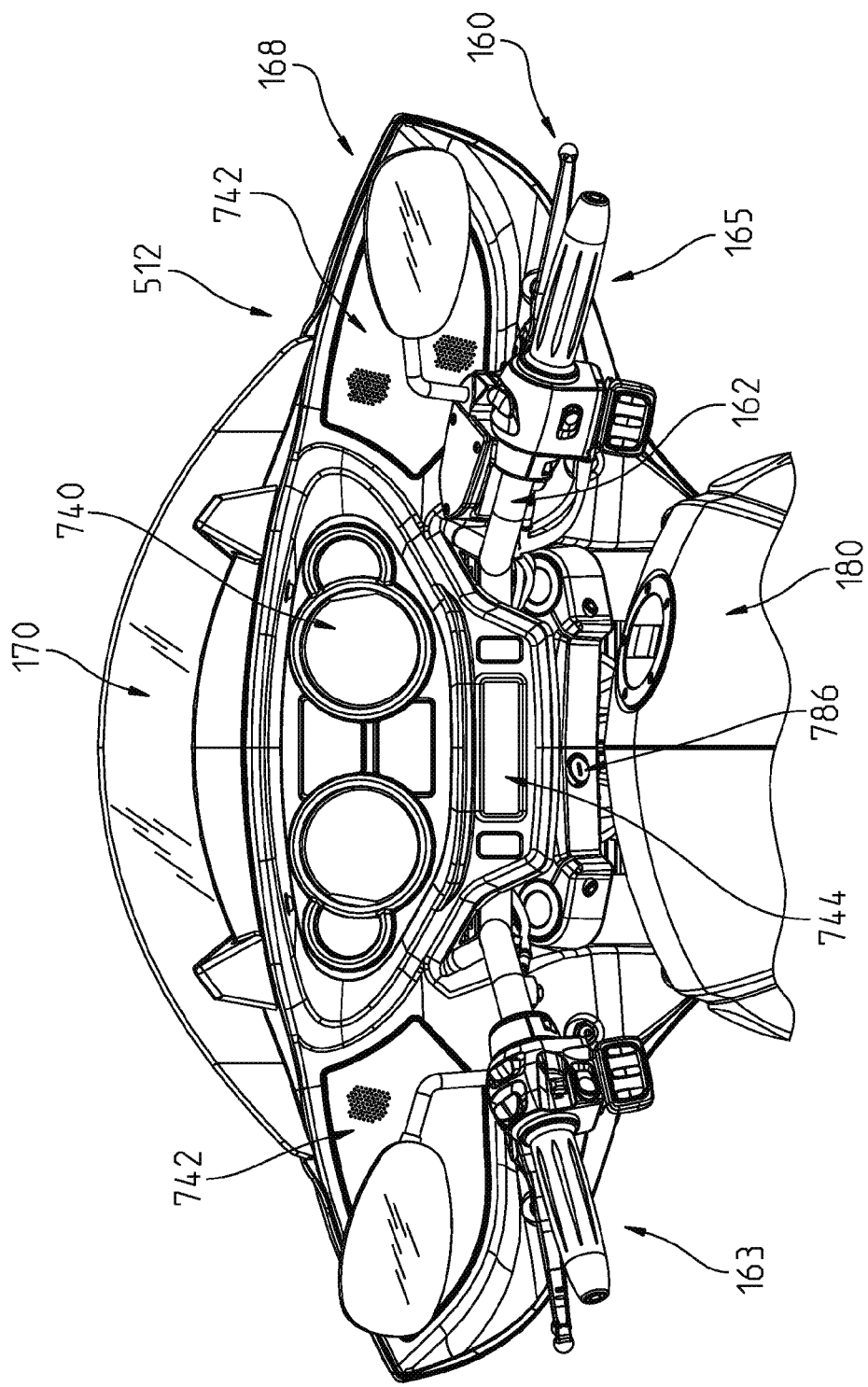
FIG. 18 illustrates a view from the perspective of an operator of the vehicle FIG. 10 positioned on a seat of the vehicle.

As explained herein, for vehicle 10 steering assembly 160 supports a steering support assembly 510 including a removable windshield 164, a front light assembly 166, and various additional components. By contrast, as shown in FIG. 18 for vehicle 20 steering assembly 160 supports a steering support assembly 512 including a front fairing assembly 168 which in turn supports a windshield 170, a front light assembly 172, and various additional components. Additional details about steering support assembly 510 and steering support assembly 512 are disclosed in U.S. patent application Ser. No. 12/478,682 filed Jun. 4, 2009, titled "TWO-WHEELED VEHICLE," and U.S. Design patent application Ser. No. 29/338,099, filed Jun. 4, 2009 titled "MOTORCYCLE,", the disclosures of which are expressly incorporated by reference herein.

Referring to FIG. 3, a fuel tank 180 is positioned between straddle seat 102 and steering assembly 160. Behind prime mover 144, a rear bodywork grouping 182 is provided. Rear wheel 112 is covered by a rear fender 188. In a similar fashion, front wheel 111 is covered by a front fender 190.

Referring to FIG. 5, a left side saddlebag 184 and a right side saddlebag 186 are provided. Saddlebags 184, 186 are each storage compartments supported by the frame and positioned proximate to the rear wheel 112. Saddlebags 184, 186 are positioned laterally outward of the rear wheel 112 and overlap a portion of the rear wheel 112 when viewed from directions 124, 126, respectively. In one embodiment, saddlebags 184 and 186 combine to provide about 21 gallons of storage space which does not intersect with centerline plane 116. Additional storage space may be provided with a trunk which is positioned on the vehicle 100 at a location which intersects with centerline plane 116.

Figure 20:
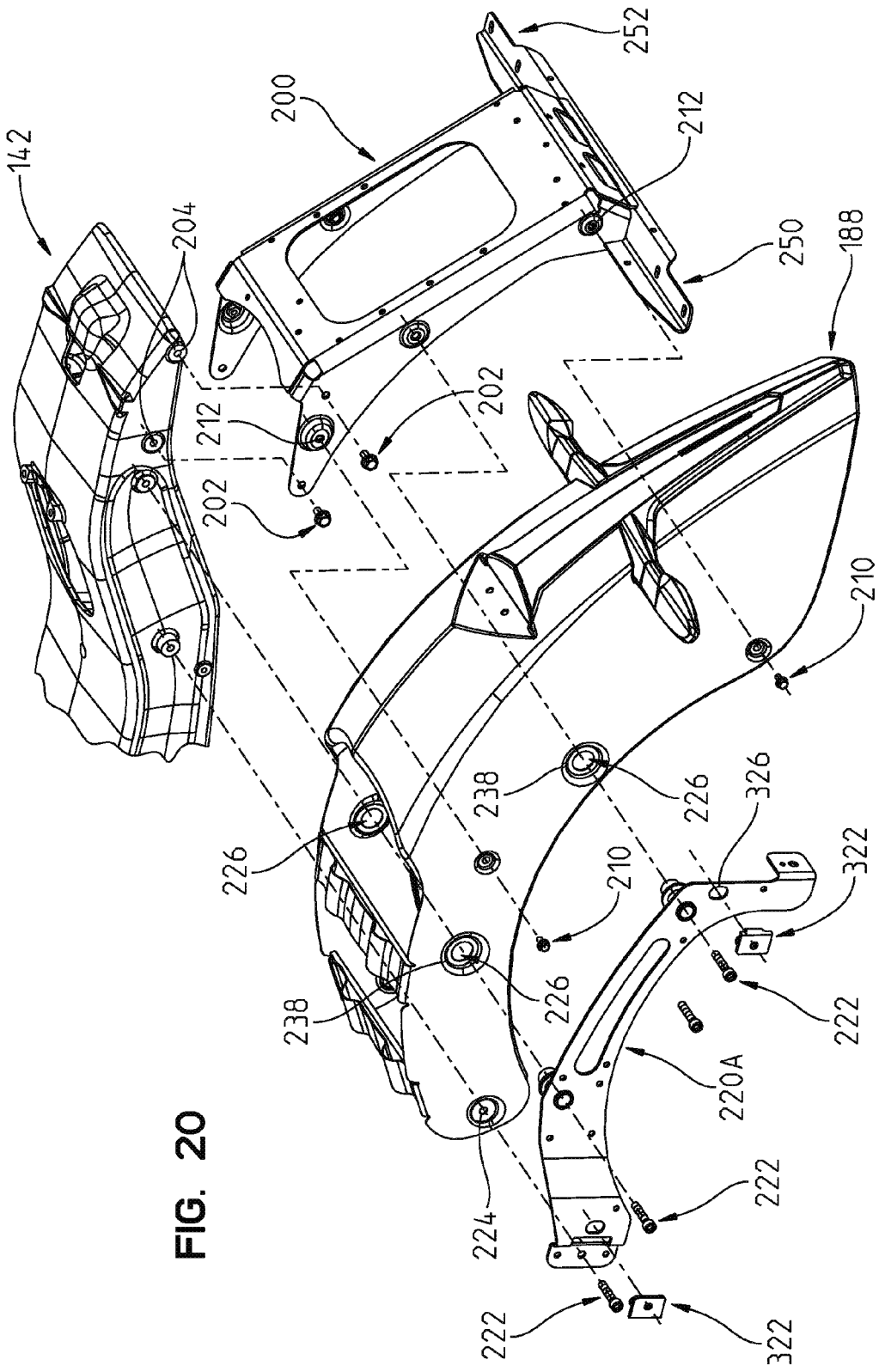
FIG. 20 illustrates the coupling of a rear fender, a rear bracket, and a side support bracket to a rear frame member of FIG. 19.

Referring to FIG. 20, rear frame member 142 supports a rear structural bracket 200. Rear structural bracket 200 is coupled to rear frame member 142 through a plurality of couplers 202 threadably received in openings 204 in rear frame member 142. Rear fender 188 is coupled to rear structural bracket 200 through couplers 210 threadably received in openings 212 in rear structural bracket 200. Rear fender 188 is further coupled to rear frame member 142 along with support brackets 220.

Figure 21:
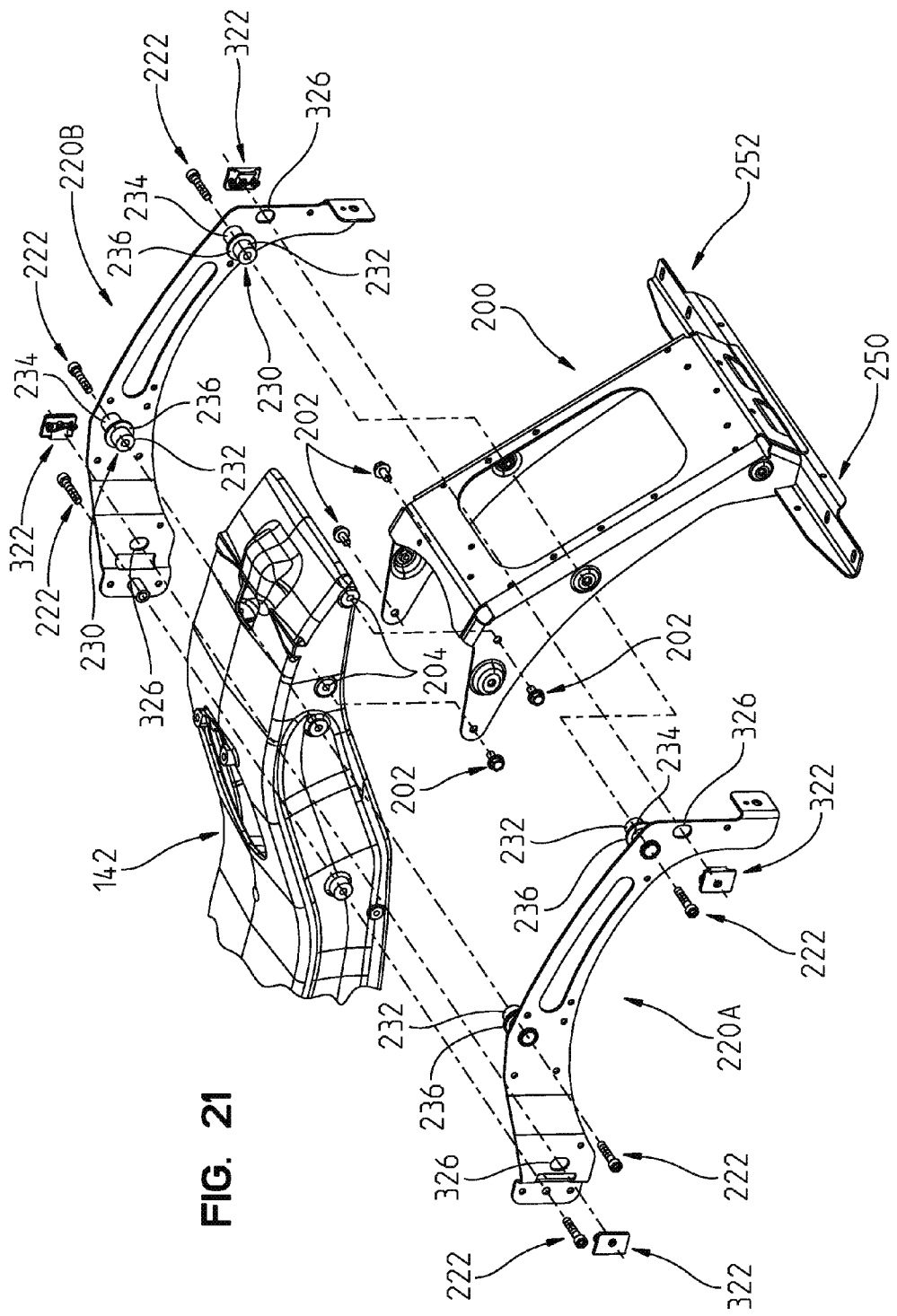
FIG. 21 illustrates the coupling of the side support brackets and the rear bracket to the rear frame member.

Support brackets 220 are coupled to rear frame member 142 through a first coupler 222 which passes through an opening 224 in rear fender 188. Support brackets 220 are also coupled to both rear frame member 142 and rear structural bracket 200 through couplers 222 which pass through openings 226 in rear fender 188. Referring to FIG. 21, support brackets 220 include supports 230 which have a first portion 232 and a second portion 234 of generally the same diameter separated by an enlarged diameter portion 236. Supports 230 are welded to support brackets 220. First portion 232 of support 230 is received in respective openings 226 of rear fender 188.

Referring to FIG. 5, second portion 234 is accessible between rear fender 188 and respective left side saddlebag 184 and right side saddlebag 186. Second portion 234 provides a location to attach accessories to two-wheeled vehicle 100. Exemplary accessories include a passenger back rest, a trunk, and a luggage rack.

Figure 22:
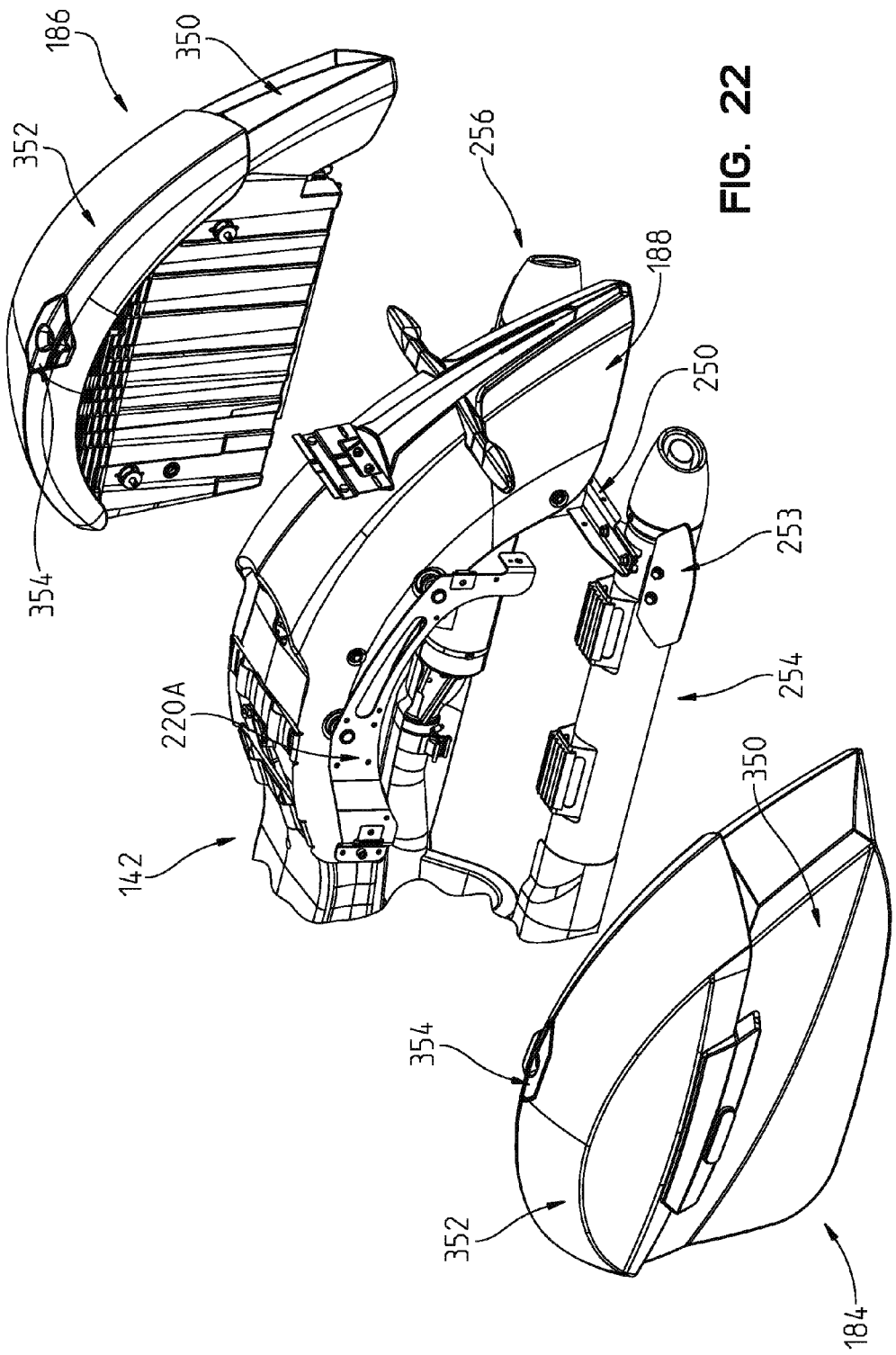
FIG. 22 illustrates the coupling of the exhaust to the rear bracket of FIG. 20.
Figure 23:
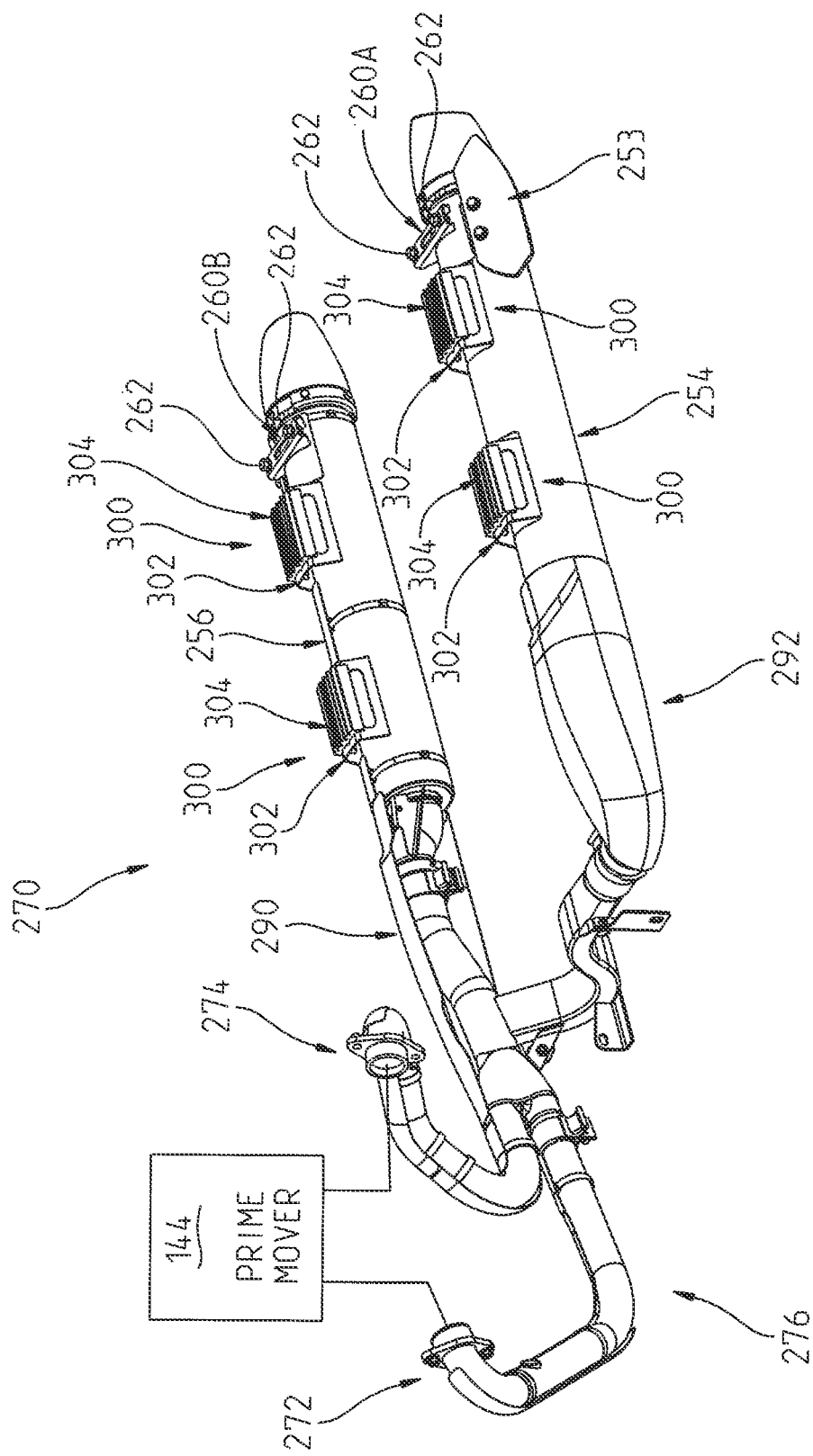
FIG. 23 illustrates components of the exhaust system.

Referring to FIG. 20, rear structural bracket 200 includes a first wing 250 and a second wing 252. Wing 250 and wing 252 couple to a left side exhaust pipe 254 and a right side exhaust pipe 256, respectively, as shown in FIG. 22. Referring to FIG. 23, left side exhaust pipe 254 and right side exhaust pipe 256 each have an attachment bracket 260. Attachment brackets 260 are welded to left side exhaust pipe 254 and right side exhaust pipe 256, respectively, and are coupled to first wing 250 and second wing 252, respectively, through threaded couplers 262.

Figure 24:
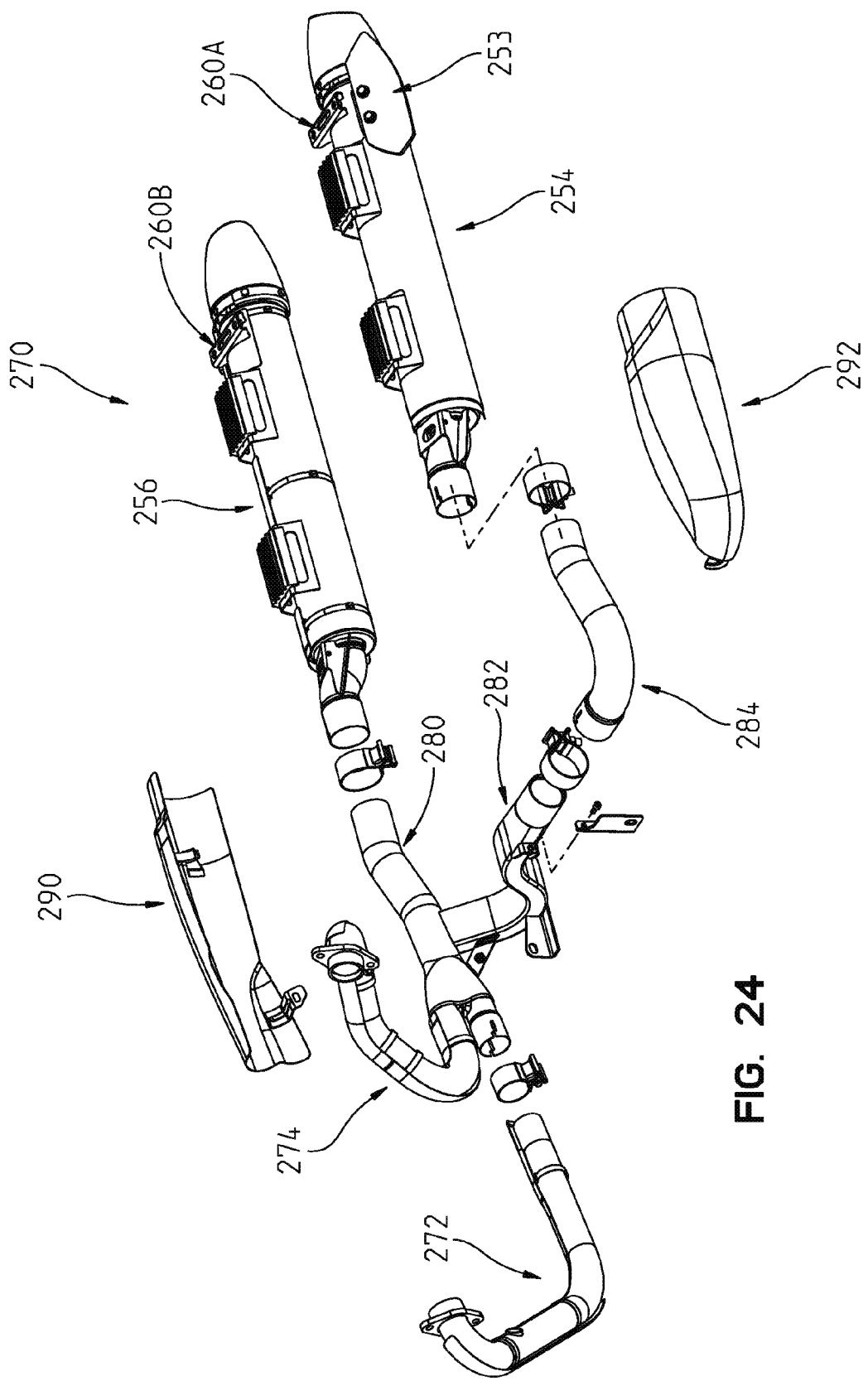
FIG. 24 illustrates is an exploded view of components of the exhaust system.

Left side exhaust pipe 254 and right side exhaust pipe 256 are part of an exhaust system 270 of two-wheeled vehicle 100. Exhaust system 270 includes front pipe 272 and rear pipe 274 which are positioned at a front end 276 of exhaust system 270 and receive exhaust from prime mover 144. Front pipe 272 and rear pipe 274 are in fluid communication with left side exhaust pipe 254 and right side exhaust pipe 256 through pipes 280, 282, and 284 (see FIG. 24). Pipes 280 and 284 are covered by heat shields 290 and 292, respectively. Left side exhaust pipe 254 and right side exhaust pipe 256 extend beyond a vertical plane 242 which passes through an axis of rotation 244 of rear wheel 112.

Left side exhaust pipe 254 and right side exhaust pipe 256 are structural components of two-wheeled vehicle 100 in that they are the primary support for left side saddlebag 184 and right side saddlebag 186, respectively. As explained herein, left side saddlebag 184 and right side saddlebag 186 are coupled to support brackets 220, as well, but support brackets 220 do not provide adequate support for the weight of left side saddlebag 184 and right side saddlebag 186. Rather, left side exhaust pipe 254 and right side exhaust pipe 256 support the weight of left side saddlebag 184 and right side saddlebag 186, respectively, and restrict the lateral movement of left side saddlebag 184 and right side saddlebag 186 in direction 296 (see FIG. 5) and direction 298 (see FIG. 5). Support brackets 220 serve to lock left side saddlebag 184 and right side saddlebag 186 in place. As such, support brackets 220 stops saddlebags 184 and 186 from tipping sideways off of two-wheeled vehicle 100, but left side exhaust pipe 254 and right side exhaust pipe 256 support the mass of left side saddlebag 184, and right side saddlebag 186, respectively.

Referring to FIG. 23, each of left side exhaust pipe 254 and right side exhaust pipe 256 includes a plurality of saddlebag supports 300. Each of saddlebag supports 300 includes a support bracket 302 which is welded to the respective one of left side exhaust pipe 254 and right side exhaust pipe 256. In the illustrated embodiment, support bracket 302 forms a raised platform which allows airflow there under. Each of saddlebag supports 300 further includes a support member 304. In one embodiment, support member 304 is an insulator to reduce the amount of heat transfer from left side exhaust pipe 254 and right side exhaust pipe 256 to left side saddlebag 184 and right side saddlebag 186, respectively. In one embodiment, support member 304 is a sound dampener which reduces the amount of rattle between left side exhaust pipe 254 or right side exhaust pipe 256 and left side saddlebag 184 or right side saddlebag 186, respectively. In one embodiment, support member 304 is a rubber member which serves as both an insulator and a sound dampener.

Figure 25:
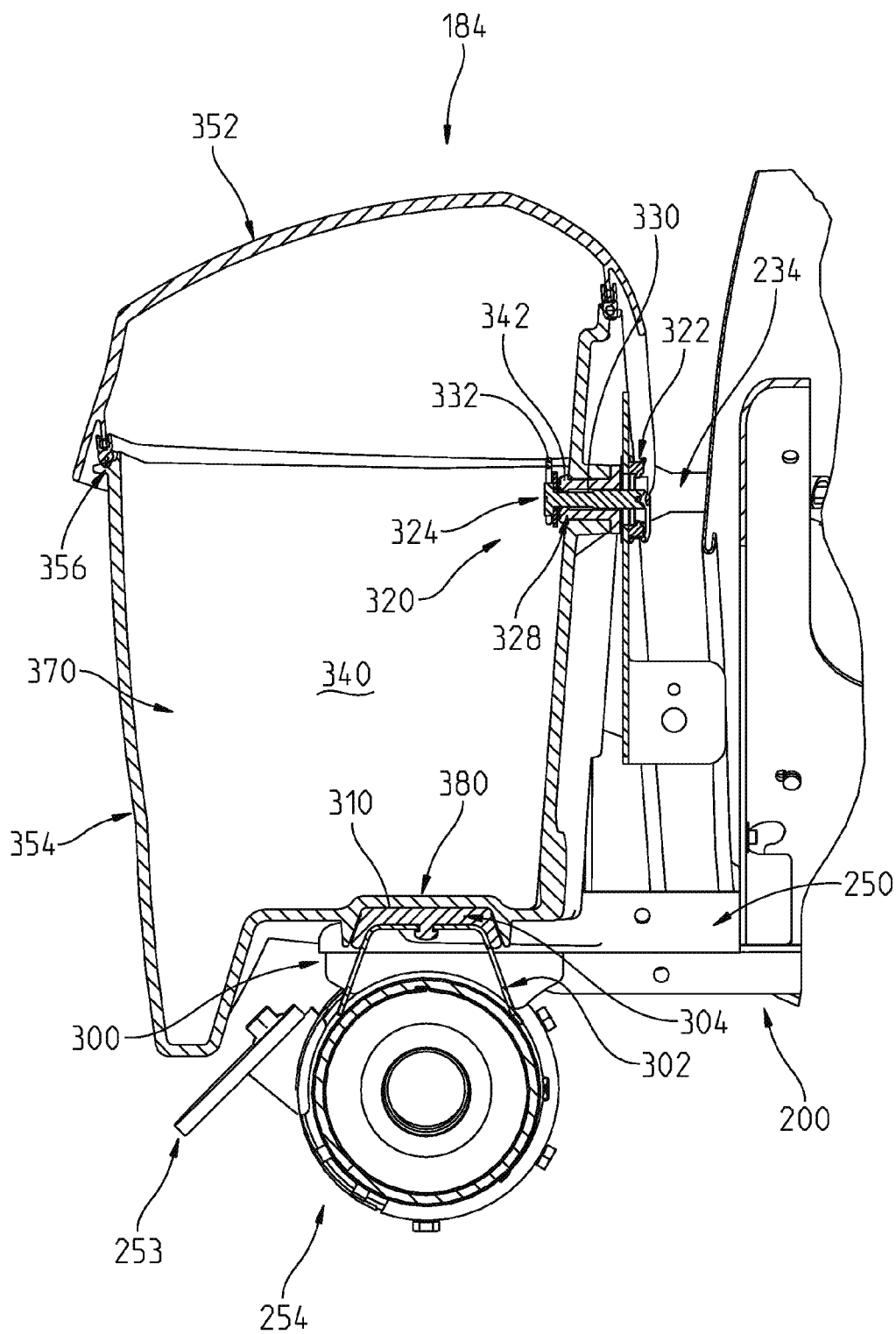
FIG. 25 illustrates a sectional view of the left saddlebag and left exhaust along lines 25-25 of FIG. 3.
Figure 26:
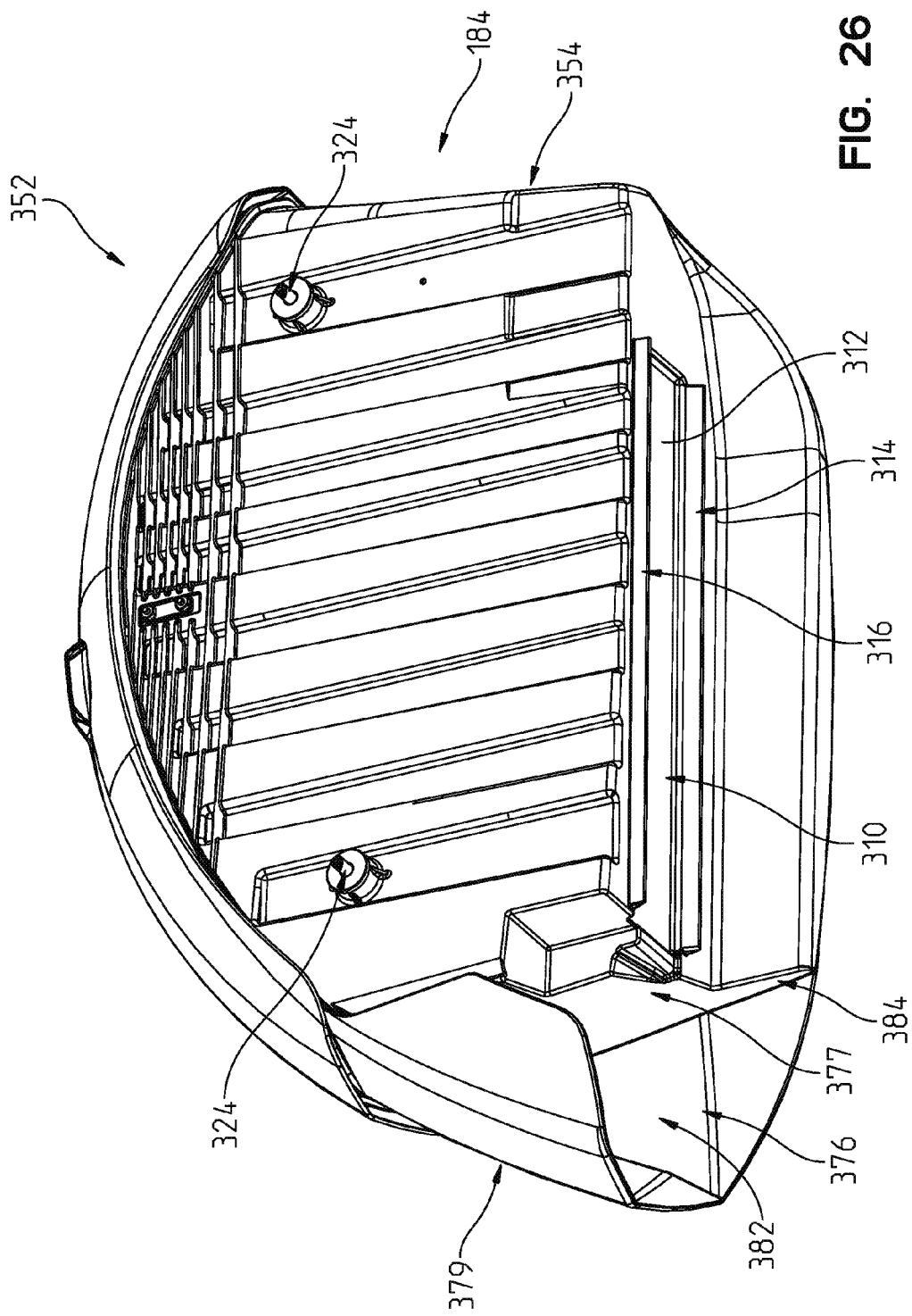
FIG. 26 illustrates a lower perspective view of the left saddlebag.
Figure 27:
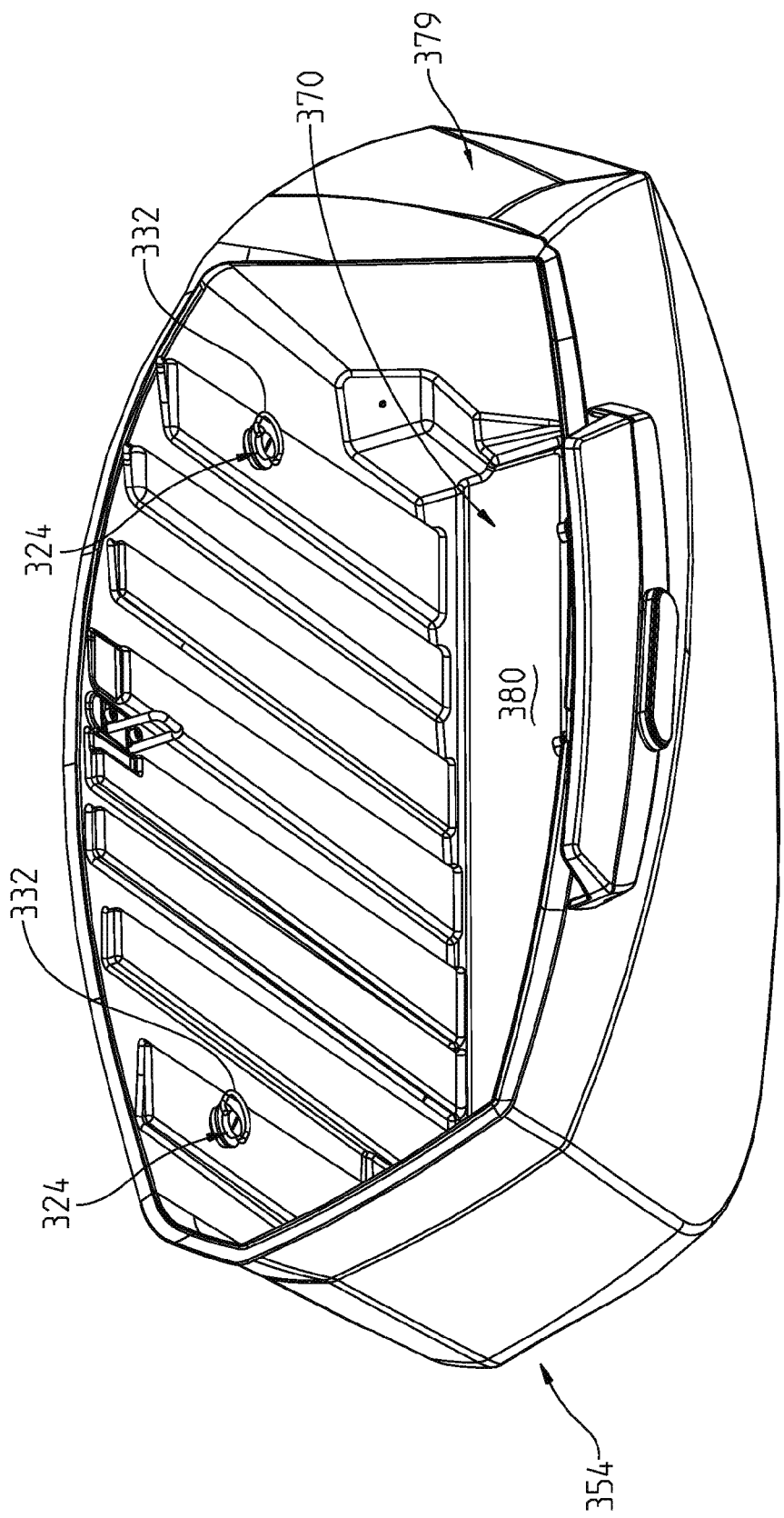
FIG. 27 illustrates an upper perspective view of the left saddlebag with the lid removed.

Referring to FIG. 25, left side saddlebag 184 is shown being supported by left side exhaust pipe 254 through one of plurality of saddlebag supports 300. As shown in FIG. 25, left side saddlebag 184 includes a locator 310 which receives a portion of plurality of saddlebag supports 300. Locator 310 locates left side saddlebag 184 relative to two-wheeled vehicle 100. As shown in FIG. 26, locator 310 includes a channel 312 extending along the bottom of left side saddlebag 184, a first retainer 314 and a second retainer 316. The presence of channel 312, first retainer 314, and second retainer 316 locates left side saddlebag 184 relative to plurality of saddlebag supports 300 and reduces the movement of left side saddlebag 184 in direction 124 (see FIG. 5) and direction 126 (see FIG. 5). A corresponding locator 300 is provided on right side saddlebag 186.

Referring to FIG. 25, a quick release coupler 320 couples left side saddlebag 184 to support bracket 220A. In one embodiment, quick release couplers 320 are quarter-turn couplers which are turned ninety degrees to move from a locked configuration to an unlocked configuration or from an unlocked configuration to a locked configuration depending on the direction of the turn. In one embodiment, quick release coupler 320 includes quarter turn receptacle 322 and a quarter turn stud 324 which interlocks with quarter turn receptacle 322 when in the locked configuration. An exemplary quarter turn receptacle is Model No. 1219-L5-305-Z3CT available from DFCI Solutions Inc. located in Orlando, Fla. 32819 at 5401 South Kirkman Road, Suite 310. An exemplary quarter turn stud is Model No. 122J-R5150-Z3CT also available from DFCI Solutions Inc. located in Orlando, Fla. 32819 at 5401 South Kirkman Road, Suite 310. Quarter turn studs 324 extend through openings 328 in left side saddlebag 184. Quarter turn receptacles 322 are clipped to support brackets 220 behind openings 326. A stud portion 330 of quarter turn stud 324 extends through openings 326 and engages quarter turn receptacle 322. Quarter turn stud 324 further includes a ring 332 which a user can grasp to alter the orientation of stud portion 330 and hence place quick release coupler 320 in one of a locked configuration and an unlocked configuration. Stud portion 330 is accessible from an interior 340 of left side saddlebag 184. Right side saddlebag 186 couples to support bracket 220B in the same manner.

Referring to FIG. 25, a rubber bushing 340 is positioned between stud 330 and the saddlebag. Rubber bushing 340 includes a reduced diameter portion 342 which prevents stud 330 from falling into the saddlebag when the quarter turn stud 324 is in the unlocked configuration.

The construction of left side saddlebag 184 is generally the same as right side saddlebag 186. Both include a cargo carrying portion 350 and a lid 352. The lid 352 is coupled to cargo carrying portion 350 through a hinge 356 (see FIG. 25) and retained in a closed position through a latch member 354. Seals are also provided between lid 352 and cargo carrying portion 350. Referring to FIG. 8, the lid 352 of left side saddlebag 184 opens in a direction 358 and the lid 352 of right side saddlebag 186 opens in a direction 360.

Figure 28:
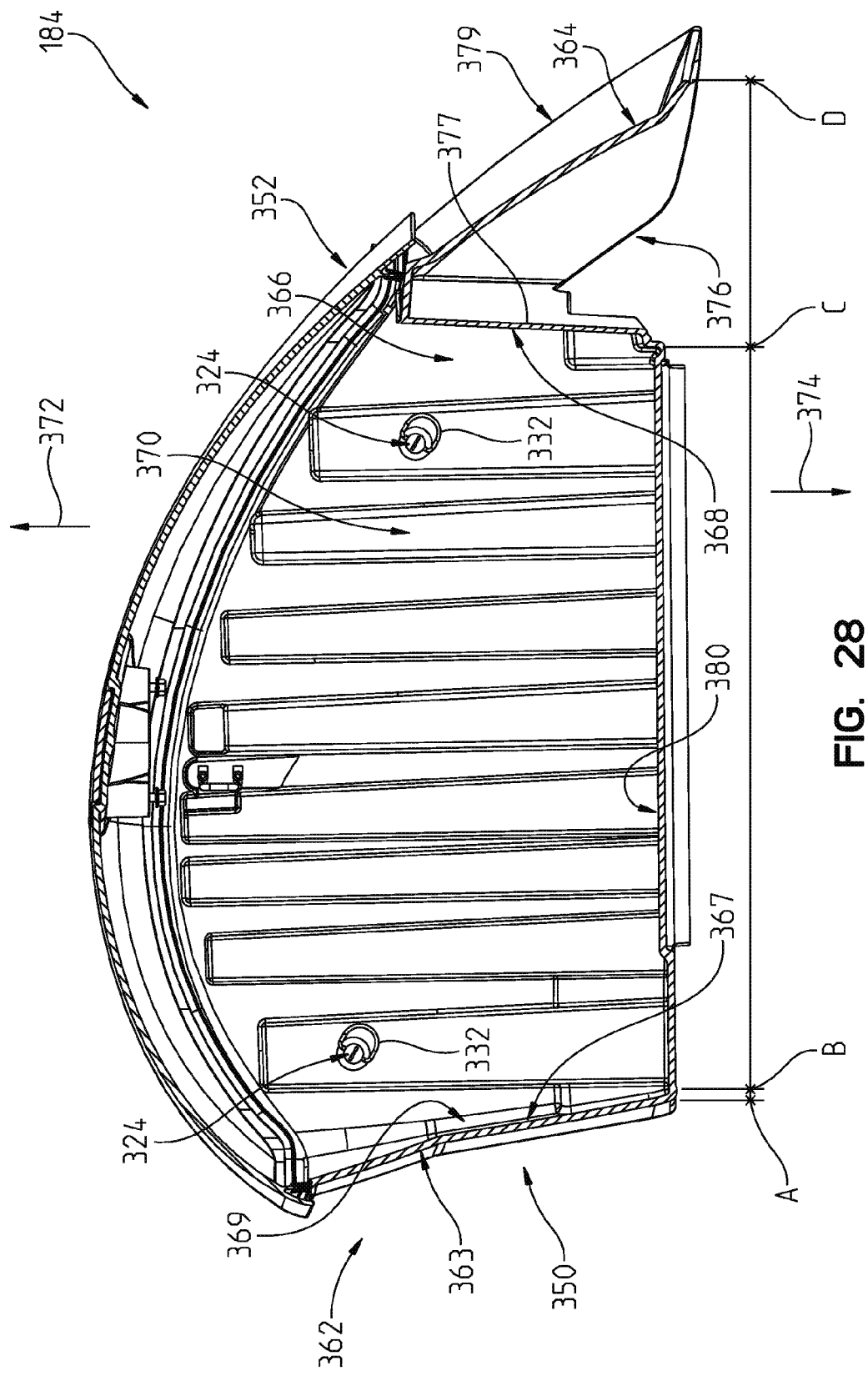
FIG. 28 illustrates a sectional view of the left saddlebag along lines 28-28 of FIG. 5.

Referring to FIG. 28, cargo carrying portion 350 is a molded body which may be molded through a two-piece mold. A cargo carrying interior 370 of cargo carrying portion 350 and portions of the A-side of cargo carrying portion 350 may be pulled generally in direction 372 while the underside of cargo carrying portion 350 and portions of the A-side of cargo carrying portion 350 may be pulled in direction 374. As shown in FIG. 28, cargo carrying portion 350 includes an open bottom portion 376 which permits left side saddlebag 184 (see FIG. 3) to have a more stylized appearance. Also, it allows an exterior of left side saddlebag 184 to vary from the shape of cargo carrying interior 370 and still retain a generally constant wall thickness for left side saddlebag 184. Open bottom portion 376 provides a way to pull the underside of rear portion 379 of cargo carrying portion 350 in direction 374. Open bottom portion 376 extends up a side of cargo carrying interior 370 and includes a portion of at least one side wall 377 of cargo carrying interior 370.

As shown in FIG. 28, cargo carrying portion 350 has a longitudinal length extending from point A to point D along a bottom edge of cargo carrying portion 350. Similarly a bottom 380 of cargo carrying interior 370 extends from point B to point C. In one embodiment, the distance from point B to point C is up to about 75 percent of the distance from point A to point D. In one embodiment, the distance from point B to point C is from about 50 percent to about 90 percent of the distance from point A to point D.

Referring to FIG. 28, the exterior of cargo carrying portion 350 has a first profile 362 which includes a front profile 363 and a rear profile 364. The cargo carrying interior 370 has a second profile 366 which includes a front profile 367 and a rear profile 368. As can be seen in FIG. 28, first profile 362 differs from second profile 366. However, portions of first profile 362 and second profile 366 match. For example, front profile 363 of first profile 362 and front profile 367 of second profile 366 are each defined by a wall 369 which has a generally constant wall thickness. As such, front profile 363 of first profile 362 and front profile 367 of second profile 366 match.

In the illustrated embodiment, left side saddlebag 184 and right side saddlebag 186 have hard exteriors which are molded. In one embodiment, the exteriors of left side saddlebag 184 and right side saddlebag 186 may be covered with a fabric, leather, or other suitable types of coverings.

In one embodiment, cargo carrying portion 350 is a single molded piece. In one embodiment, cargo carrying portion 350 is made from a plurality of pieces. In one embodiment, cargo carrying portion 350 includes an opening from open bottom portion 376 to cargo carrying interior 370 in region 384 (see FIG. 26). This opening is included to reduce the likelihood of a sink mark forming on the exterior of cargo carrying portion 350 due to the intersection of wall 377 with wall 382. The opening in region 384 is subsequently filled in an after-molding operation. In one embodiment, the opening is filled with a flowable material. In one embodiment, the opening is filled with a second piece which is snapped or otherwise secured to the molded portion of cargo carrying portion 350.

Figure 29:
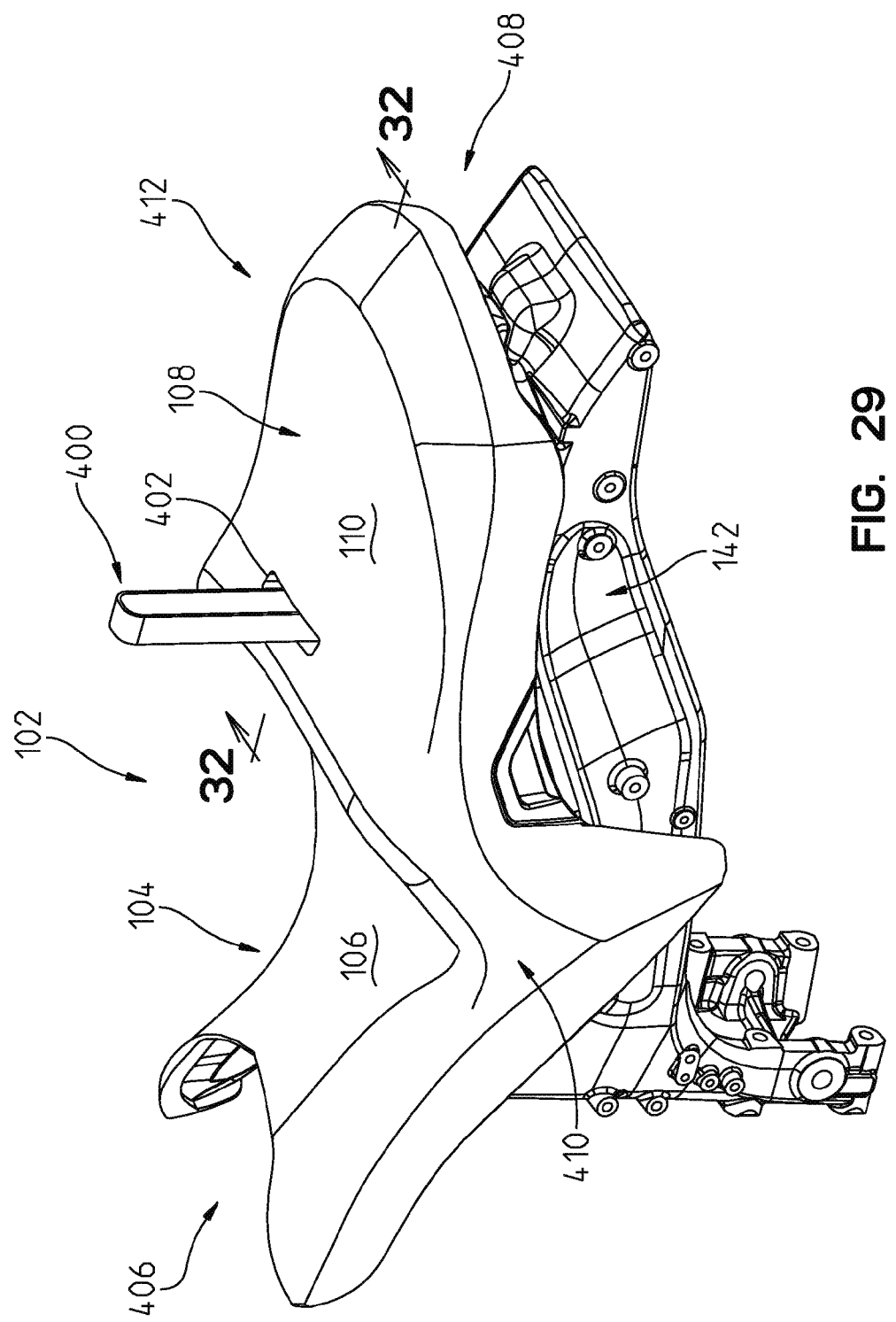
FIGS. 29 and 30 illustrate a passenger hand grip extending through an opening in the straddle seat.

Referring to FIG. 29, straddle seat 102 is shown having an opening 402 through which a passenger hand grip member 400 is extending. Passenger hand grip member 400 is illustratively a flexible strap. Passenger hand grip member 400 may be any suitable type of device that a passenger may hold onto during operation of two-wheeled vehicle 100.

Opening 402 is positioned within an outside envelope 404 of straddle seat 102 when viewed from above (see FIG. 5). Opening 402 does not intersect with the front 406 of straddle seat 102, the back 408 of straddle seat 102, the left side 410 of straddle seat 102, and the right side 412 of straddle seat 102.

Figure 30:
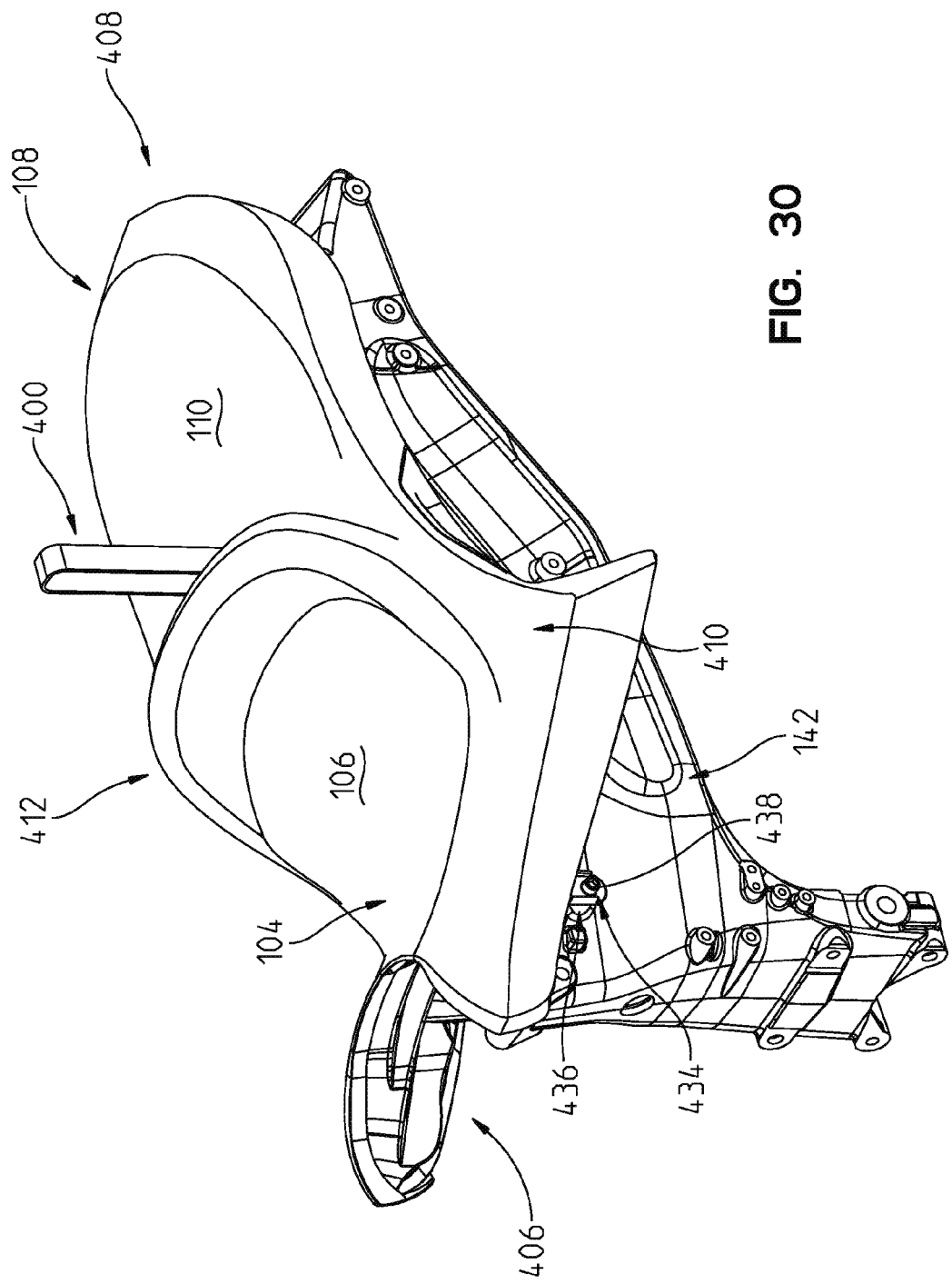
Figure 31:
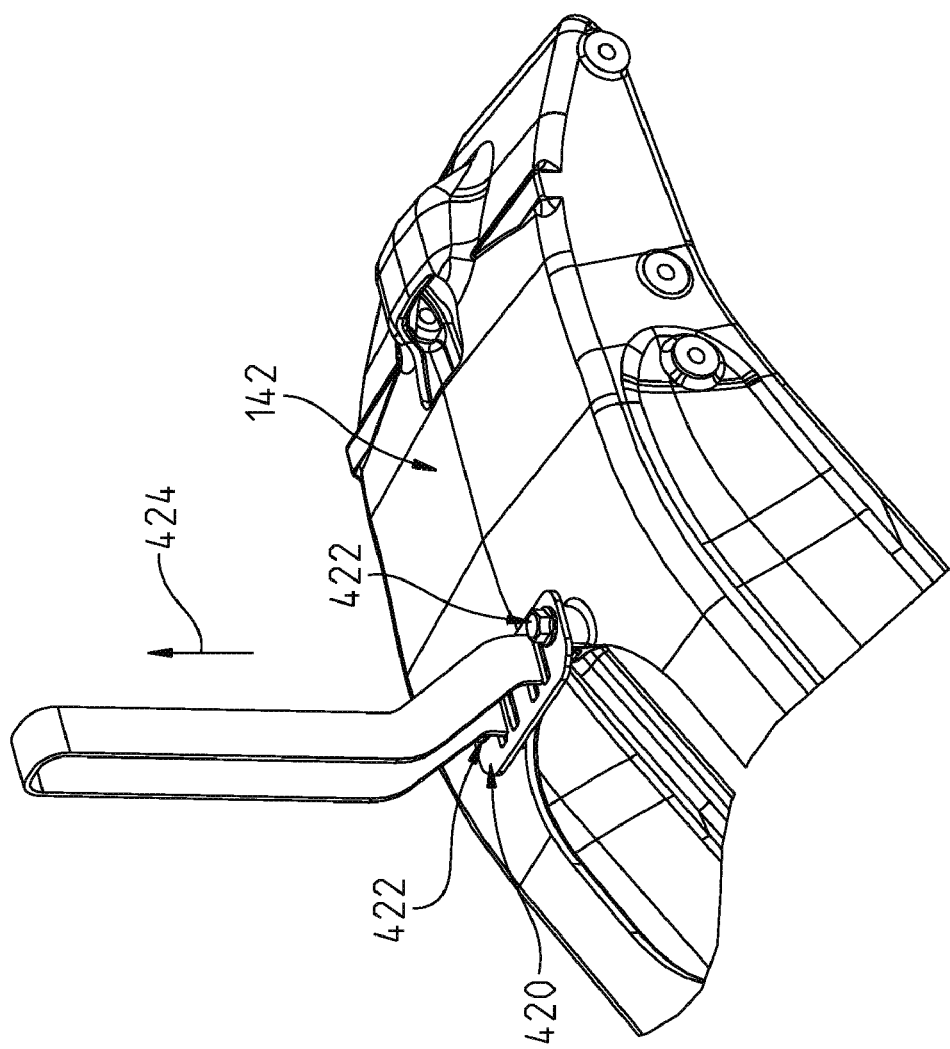
FIG. 31 illustrates the coupling of the passenger hand grip to the rear frame member.
Figure 32:
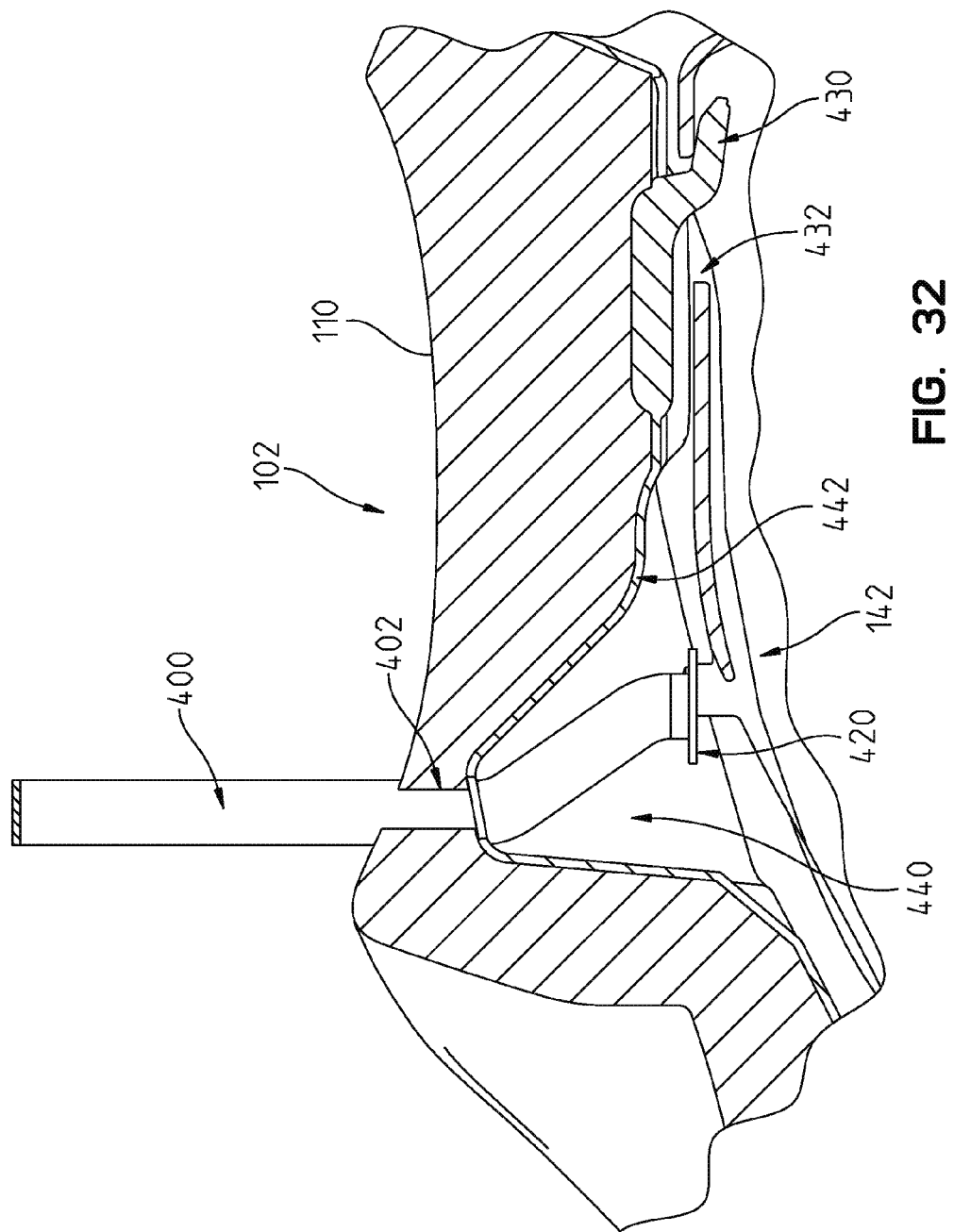
FIG. 32 illustrates a sectional view of the passenger hand grip along lines 32-32 of FIG. 29.

Referring to FIG. 31, passenger hand grip member 400 is coupled to a bracket 420. In one embodiment, passenger hand grip member 400 is coupled to bracket 420 by stitching. Other exemplary methods of coupling passenger hand grip member 400 to bracket 420 include riveting, gluing, bolting, clamping, stapling, and other suitable methods. Bracket 420 in turn is coupled directly to rear frame member 142 through couplers 422. Passenger hand grip member 400 is coupled to rear frame member 142 independent of straddle seat 102. As shown in FIG. 32, a latch member 430 of straddle seat 102 is received in opening 432 of frame 142 and receives a portion of frame 142. As shown in FIG. 30 a tab 434 of straddle seat 102 is coupled to a boss 436 of frame 142 with a coupler 438. As such, the construction of straddle seat 102 does not need to account for the passenger hand grip. In one embodiment, passenger hand grip member 400 is able to experience a force of at least 450 pounds in direction 424 without separating from rear frame member 142 or otherwise breaking. Since passenger hand grip member 400 is coupled to rear frame member 142 independent of straddle seat 102, straddle seat 102 may be removed without also removing or uncoupling passenger hand grip member 400 from rear frame member 142.

Referring to FIG. 32, passenger hand grip member 400 is shown extended above straddle seat 102 in a use position. Passenger hand grip member 400 may also be stowed below support surface 110 of straddle seat 102 in storage area 440 provided between a lower side 442 of straddle seat 102 and rear frame member 142. When positioned in storage area 440 or at least below support surface 110 of straddle seat 102, passenger hand grip member 400 is in a stored position.

Figure 33:
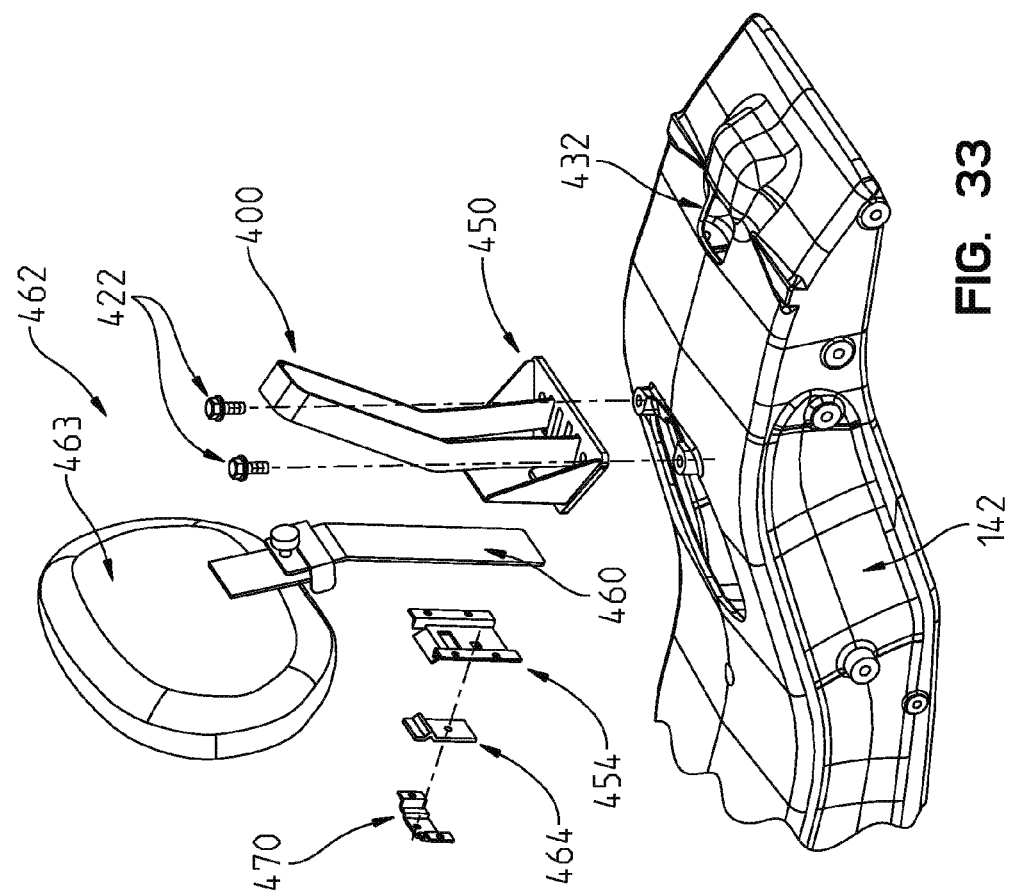

Referring to FIG. 33, passenger hand grip member 400 is coupled to a bracket 450. In one embodiment, passenger hand grip member 400 is coupled to bracket 450 by stitching. Other exemplary methods of coupling passenger hand grip member 400 to bracket 450 include rivoting, gluing, bolting, clamping, stapling, and other suitable methods Bracket 450 in turn is coupled directly to rear frame member 142 through couplers 422. With bracket 450, passenger hand grip member 400 is still coupled to rear frame member 142 independent of straddle seat 102.

Figure 34:
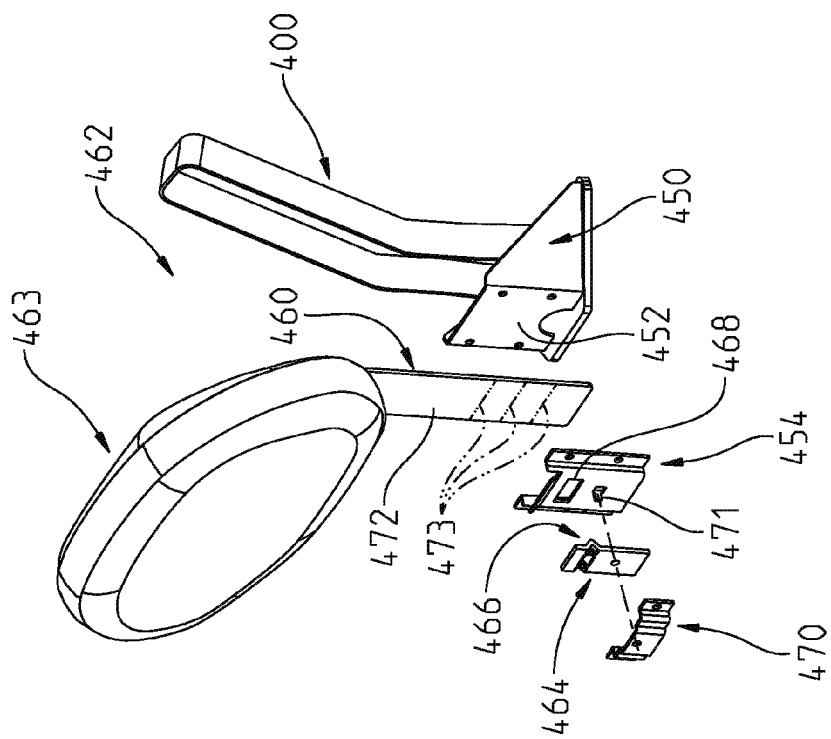
FIGS. 33 and 34 illustrate the coupling of a passenger hand grip and a driver backrest to the rear frame member.
Figure 35:
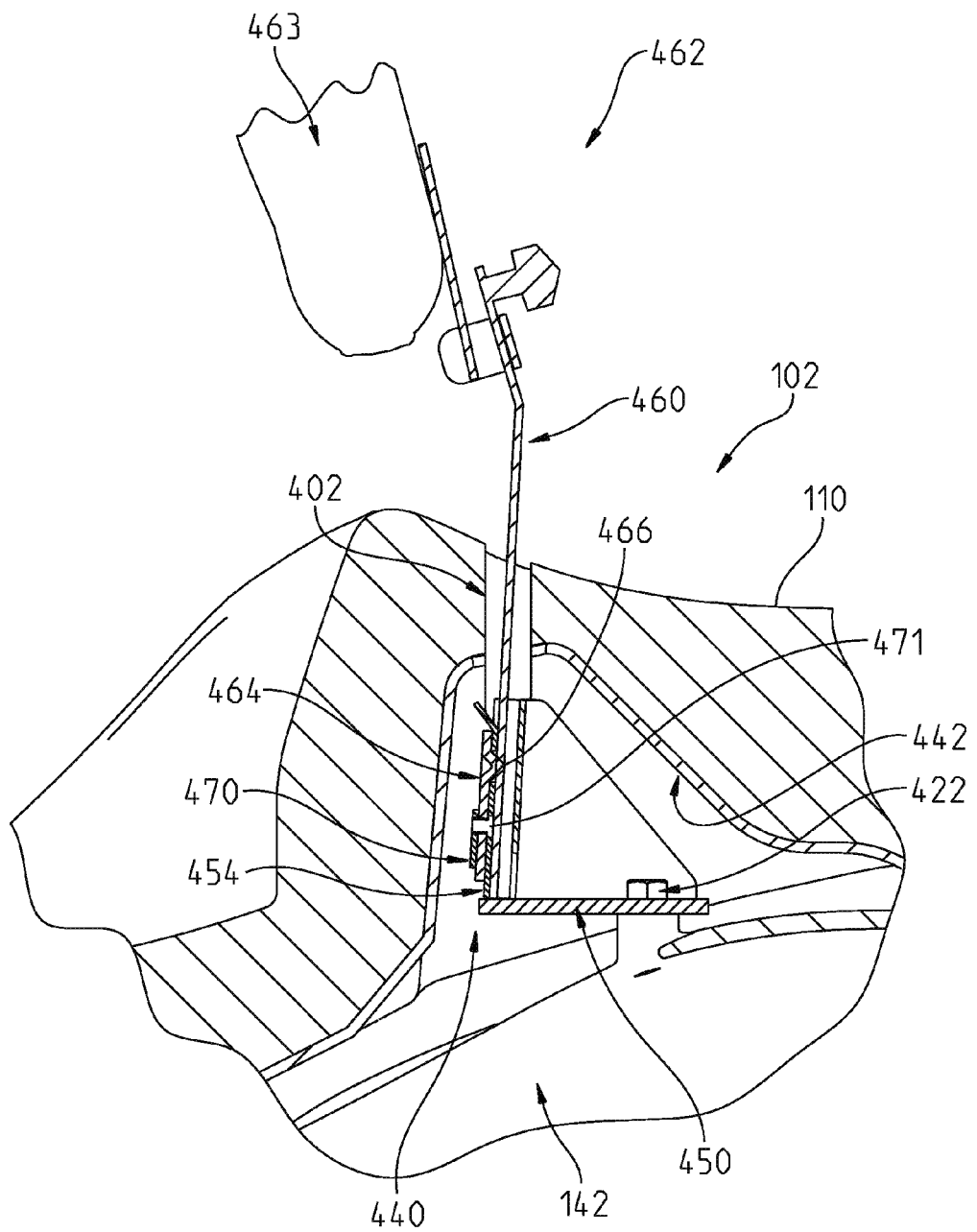
FIGS. 35-37 illustrate the passenger hand grip and driver backrest relative to the straddle seat.
Figure 36:
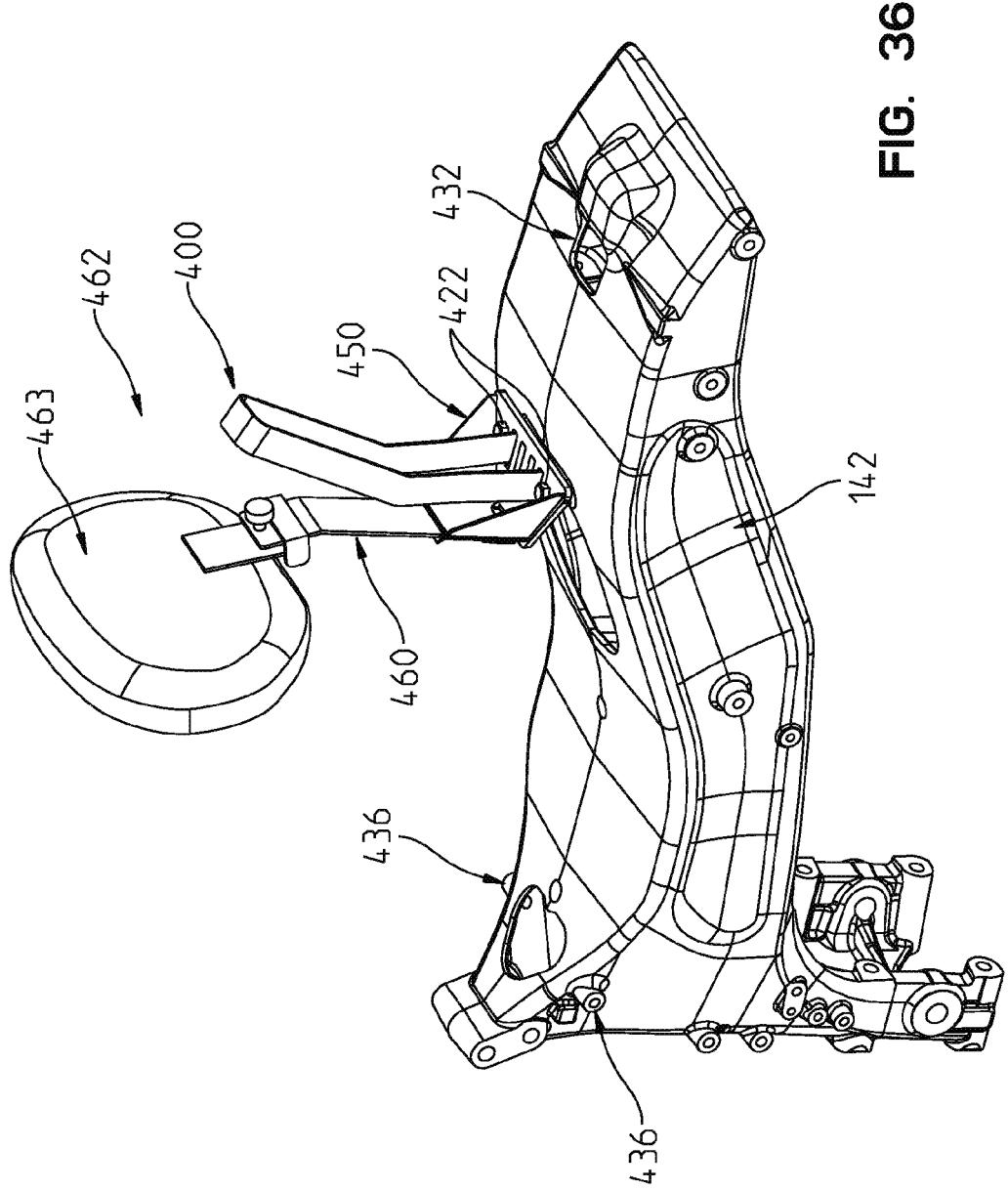
Figure 37:
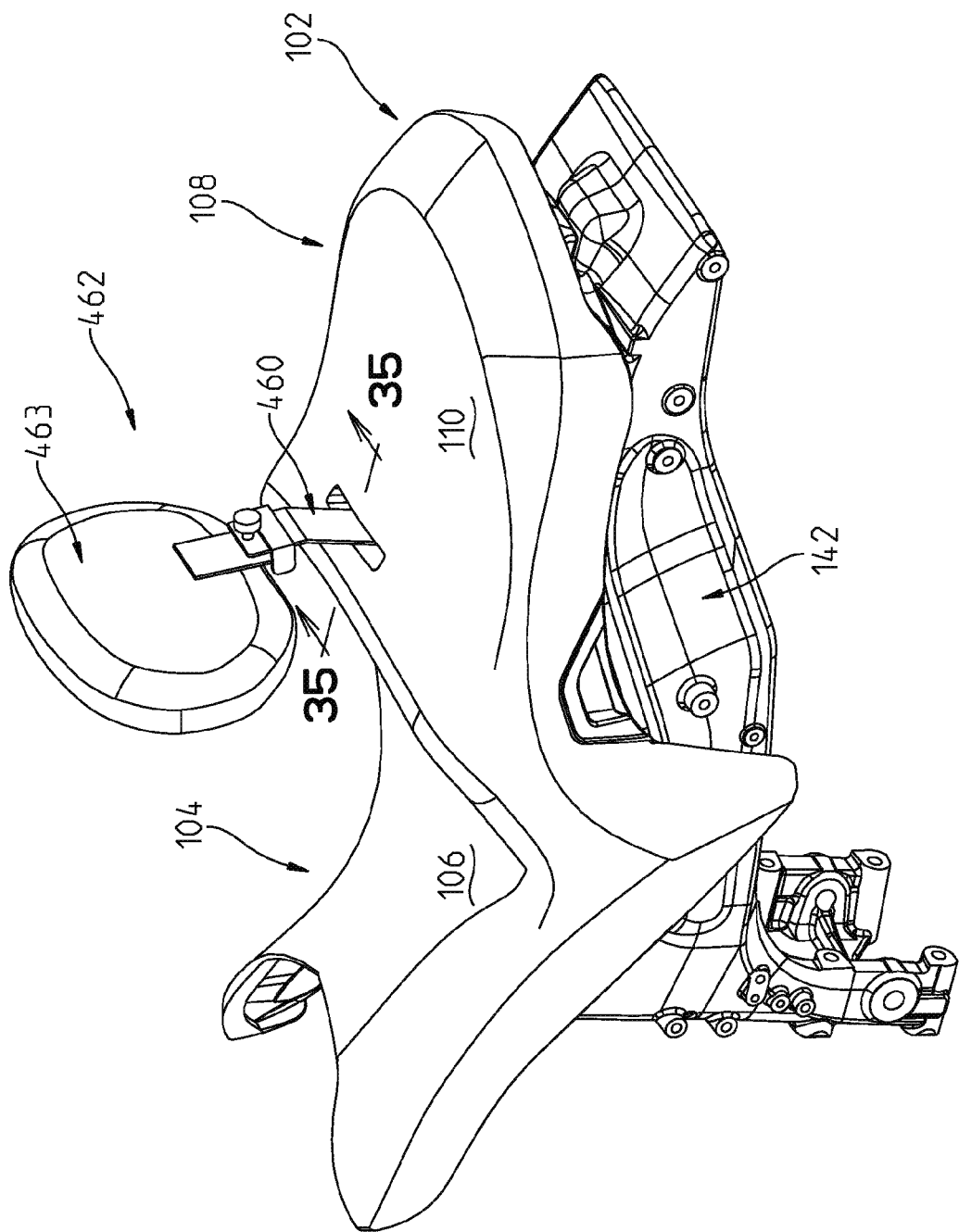

Referring to FIG. 34, bracket 450 includes a front face 452 to which a holder 454 is coupled. Holder 454 may be coupled by rivets, welding, bolts or any other suitable types of couplers. Holder 454 and front face 452 cooperate to provide a receiver for receiving a support post 460 of a driver backrest 462 having a support member 463. A locator 464 includes a detent member 466 which extends through a window 468 provided in holder 454 as shown in FIG. 35. Locator 464 is held in place relative to holder 454 with retainer 470. Retainer 470 is coupled to holder 454. Retainer 470 may be coupled by rivets, welding, bolts or any other suitable types of couplers. Holder 454 includes a tab 471 which is received in an opening of locator 464 to prevent locator 464 from moving upward or downward relative to holder 454.

In one embodiment, a front surface 472 of support post 460 includes a plurality of spaced apart recesses indicated by dashed lines 473 which interact with detent member 466 to provide predetermined height locations of driver backrest 462.

Referring to FIG. 35, storage area 440 is still provided between rear frame member 142 and lower side 442 of straddle seat 102. As such, passenger hand grip member 400 may still be stored in storage area 440. Further, driver backrest 462 may be removed and stored in one of left side saddlebag 184 or right side saddlebag 186.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A two-wheeled vehicle, comprising:
a front wheel rotatable about a first axis;
a rear wheel generally positioned in line with the front wheel along a longitudinal plane of the two-wheeled vehicle;
a frame supported by the front wheel and the rear wheel;
a straddle seat supported by the frame;
an internal combustion engine coupled to the frame and operably coupled to the rear wheel to power the rear wheel;
an exhaust system coupled at a first end to the internal combustion engine and extending rearward of a vertical plane passing through an axis of rotation of the rear wheel, the exhaust system including an exhaust pipe; and
a saddlebag positioned on a first side of the longitudinal plane, the saddlebag supported by the exhaust pipe of the exhaust system.

2. The two-wheeled vehicle of claim 1, wherein the frame includes a rear cast frame member and a support bracket extending down from and coupled to the rear cast frame member, the support bracket coupling a rear portion of the exhaust system to the frame.

3. The two-wheeled vehicle of claim 2, wherein the support bracket includes a wing portion which is coupled to the exhaust system.

4. The two-wheeled vehicle of claim 1, further comprising:
a saddlebag support supported by the exhaust system, the saddlebag support being positioned between the exhaust system and the saddlebag.

5. The two-wheeled vehicle of claim 4, wherein the saddlebag support is coupled to the exhaust system.

6. The two-wheeled vehicle of claim 4, wherein the saddlebag support includes a heat isolation member which is contacting a lower side of the first saddlebag.

7. The two-wheeled vehicle of claim 4, wherein the saddlebag includes a locator which locates the saddlebag relative to the saddlebag support.

8. The two-wheeled vehicle of claim 1, further comprising a side bracket coupled to the frame; and
a rear fender covering a portion of the rear wheel, the side bracket being positioned between the saddlebag and the rear fender and keeps the saddlebag spaced apart from the rear fender.

9. The two-wheeled vehicle of claim 1, wherein the saddlebag is positioned directly over the exhaust pipe.

10. A two-wheeled vehicle, comprising:
a front wheel rotatable about a first axis;
a rear wheel generally positioned in line with the front wheel along a longitudinal plane of the two-wheeled vehicle;
a frame supported by the front wheel and the rear wheel;
a straddle seat supported by the frame;
an internal combustion engine coupled to the frame and operably coupled to the rear wheel to power the rear wheel;
an exhaust system coupled at a first end to the internal combustion engine and extending rearward of a vertical plane passing through an axis of rotation of the rear wheel; and
a saddlebag positioned on a first side of the longitudinal plane, the saddlebag supported by the exhaust system, wherein the saddlebag includes a locator which locates the saddlebag relative to the saddlebag support and wherein the locator includes a channel that receives a portion of the saddlebag support and a first retainer and a second retainer which extend down from the saddlebag along a first side and a second side of the saddlebag support, respectively.

11. A two-wheeled vehicle, comprising:
a front wheel rotatable about a first axis;
a rear wheel generally positioned in line with the front wheel along a longitudinal plane of the two-wheeled vehicle;
a frame supported by the front wheel and the rear wheel;
a straddle seat supported by the frame;
an internal combustion engine coupled to the frame and operably coupled to the rear wheel to power the rear wheel;

an exhaust system coupled at a first end to the internal combustion engine and extending rearward of a vertical plane passing through an axis of rotation of the rear wheel;

a saddlebag positioned on a first side of the longitudinal plane, the saddlebag supported by the exhaust system;

a side bracket coupled to the frame;

a rear fender covering a portion of the rear wheel, the side bracket being positioned between the saddlebag and the rear fender and keeps the saddlebag spaced apart from the rear fender;

a quick connect fitting have a first portion supported by the saddlebag and a second portion supported by the side bracket, the first portion and the second portion cooperate to lock the saddlebag to the side bracket; and a support member positioned in an opening in the saddlebag, the support member retaining a position of the first portion of the quick connect fitting relative to the saddlebag when the first portion of the quick connect fitting is spaced apart from the second portion of the quick connect fitting, wherein the first portion of the quick connect fitting is actuatable from an interior of the saddlebag.

12. A two-wheeled vehicle, comprising:

a front wheel rotatable about a first axis;

a rear wheel generally positioned in line with the front wheel along a longitudinal plane of the two-wheeled vehicle;

a frame supported by the front wheel and the rear wheel;

a straddle seat supported by the frame;

a prime mover coupled to the frame and operably coupled to the rear wheel to power the rear wheel; and a saddlebag positioned completely on a first side of the longitudinal plane, the saddlebag having a cargo carrying interior accessible through a top portion of the saddlebag and an open bottom portion, wherein the open bottom portion extends up at least a rear wall of the cargo carrying interior of the saddlebag.

13. The two-wheeled vehicle of claim 12, wherein the open bottom portion extends up at least one wall of the cargo carrying interior of the saddlebag.

14. The two-wheeled vehicle of claim 12, wherein the open bottom portion extends completely up at least one wall of the cargo carrying interior of the saddlebag.

15. The two-wheeled vehicle of claim 12, wherein the cargo carrying interior and the open bottom are molded as one piece.

16. The two-wheeled vehicle of claim 12, wherein the saddlebag is supported by the frame on a left side of the longitudinal plane of the two-wheeled vehicle and an exterior of the saddlebag has a first profile defined by a second longitudinal plane that is parallel to the longitudinal plane and the cargo carrying interior of the saddlebag has a second profile defined by the second longitudinal plane, the second profile differing from the first profile.

17. The two-wheeled vehicle of claim 16, wherein the second profile includes a front wall and a rear wall, the front wall also defines a front profile of the first profile, the front profile of the first profile matches a profile of the front wall of the second profile.

18. The two-wheeled vehicle of claim 12, wherein an exterior of the saddlebag conceals the open bottom portion.

19. The two-wheeled vehicle of claim 12, wherein an extent of a bottom of the cargo carrying interior along a first plane parallel to the longitudinal plane is up to about 90 percent of a lower extent of an exterior of the saddlebag along the first plane.

20. The two-wheeled vehicle of claim 19, wherein the extent of the bottom of the cargo carrying interior along the first plane parallel to the longitudinal plane is at least about 50 percent of the lower extent of the exterior of the saddlebag along the first plane.

21. The two-wheeled vehicle of claim 19, wherein the extent of the bottom of the cargo carrying interior along the first plane parallel to the longitudinal plane is up to about 75 percent of the lower extent of the exterior of the saddlebag along the first plane.

22. A two-wheeled vehicle, comprising:

a front wheel rotatable about a first axis;

a rear wheel generally positioned in line with the front wheel along a longitudinal plane of the two-wheeled vehicle;

a frame supported by the front wheel and the rear wheel;

a straddle seat supported by the frame;

a prime mover coupled to the frame and operably coupled to the rear wheel to power the rear wheel; and a saddlebag positioned on a first side of the longitudinal plane, the saddlebag having a cargo carrying interior accessible through a top portion of the saddlebag and an open bottom portion, wherein the saddlebag is supported by the frame on a left side of the longitudinal plane of the two-wheeled vehicle and an exterior of the saddlebag has a first profile defined by a second longitudinal plane that is parallel to the longitudinal plane and the cargo carrying interior of the saddlebag has a second profile defined by the second longitudinal plane, the second profile differing from the first profile, the second profile includes a front wall and a rear wall, the front wall also defines a front profile of the first profile, the front profile of the first profile matches a profile of the front wall of the second profile, the open bottom portion separates a lower portion of the rear wall of the second profile from a rear profile of the first profile.

23. A two-wheeled vehicle, comprising:

a front wheel rotatable about a first axis;

a rear wheel generally positioned in line with the front wheel along a longitudinal plane of the two-wheeled vehicle;

a frame supported by the front wheel and the rear wheel;

a straddle seat supported by the frame, the straddle seat having a support surface including a first region for supporting a driver and a second region for supporting a passenger;

an internal combustion engine coupled to the frame and operably coupled to the rear wheel to power the rear wheel;

an exhaust system coupled at a first end to the internal combustion engine and extending rearward of a vertical plane passing through an axis of rotation of the rear wheel;

a saddlebag positioned on a first side of the longitudinal plane, the saddlebag supported by the exhaust system; and a passenger hand grip positioned in front of a rear end of the straddle seat and extendable through an opening in the straddle seat, the opening extending from a lower side of the straddle seat to an upper side of the seat.

24. The two-wheeled vehicle of claim 23, wherein the passenger hand grip is positioned completely below the support surface of the straddle seat in a stored position and a portion of the passenger hand grip is positioned above the support surface of the straddle seat in a use position.

25. The two-wheeled vehicle of claim 24, wherein the straddle seat and the frame cooperate to define a storage area for the passenger hand grip.

26. The two-wheeled vehicle of claim 23, wherein the passenger hand grip is coupled to the frame independent of the straddle seat.

27. The two-wheeled vehicle of claim 23, wherein the passenger hand grip includes a flexible strap which may be grasped by the passenger, a portion of the flexible strap being positionable above the support surface of the straddle seat in a use position and below the support surface of the straddle seat in a stored position.

28. The two-wheeled vehicle of claim 23, wherein the opening is provided in the straddle seat at a location completely within an envelope of the straddle seat.

29. The two-wheeled vehicle of claim 28, wherein the opening is provided in the second region of the straddle seat.

30. The two-wheeled vehicle of claim 23, wherein a driver backrest is removably coupled to the frame through the opening.

31. The two-wheeled vehicle of claim 30, wherein a support bracket is coupled to the frame, the support bracket being coupled to the driver backrest and the passenger hand grip at spaced apart locations.

32. The two-wheeled vehicle of claim 31, wherein the support bracket supports a detent member which interacts with a plurality of corresponding detent members on a support post of the driver backrest to position the driver backrest at predetermined heights.

33. The two-wheeled vehicle of claim 23, further comprising a passenger hand grip coupled to the frame of the two-wheeled vehicle independent of the straddle seat, the straddle seat including an opening which extends from a lower side of the straddle seat to an upper side of the straddle seat and which is positioned proximate to the passenger hand grip.

34. The two-wheeled vehicle of claim 33, wherein the straddle seat may be removed from the frame without uncoupling the passenger hand grip from the frame.

* * * * *